United States Patent
Nakayoshi et al.

(10) Patent No.: US 10,518,995 B2
(45) Date of Patent: Dec. 31, 2019

(54) IMAGE SCANNING APPARATUS AND CONTROL METHOD THEREOF

(71) Applicant: CANON KABUSHIKI KAISHA, Tokyo (JP)

(72) Inventors: Asahiro Nakayoshi, Matsudo (JP); Satoshi Seki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/128,989

(22) Filed: Sep. 12, 2018

(65) Prior Publication Data

US 2019/0100398 A1    Apr. 4, 2019

(30) Foreign Application Priority Data

Sep. 29, 2017 (JP) ................. 2017-190957

(51) Int. Cl.
*B65H 7/20* (2006.01)
*H04N 1/387* (2006.01)
*H04N 1/00* (2006.01)

(52) U.S. Cl.
CPC ............ *B65H 7/20* (2013.01); *H04N 1/0071* (2013.01); *H04N 1/00615* (2013.01); *H04N 1/00652* (2013.01); *H04N 1/00713* (2013.01); *H04N 1/00748* (2013.01); *H04N 1/00771* (2013.01); *H04N 1/3878* (2013.01)

(58) Field of Classification Search
CPC .. H04N 1/04; H04N 1/00702; H04N 1/00708; H04N 1/0071; H04N 1/00713; H04N 1/00779; H04N 1/0079; H04N 2201/0094; H04N 1/00615; H04N 1/00652; H04N 1/00748; H04N 1/00771; H04N 1/3878; B65H 2553/41; B65H 7/125; B65H 7/20; G06K 13/067; G07D 11/10
USPC .......................... 358/498, 496, 497
See application file for complete search history.

(56) References Cited

U.S. PATENT DOCUMENTS

| | | | |
|---|---|---|---|
| 4,737,627 A * | 4/1988 | Hughes | B65H 7/125 250/223 R |
| 8,976,421 B2 | 3/2015 | Kobayashi et al. | H04N 1/00681 |
| 9,555,985 B2 | 1/2017 | Kimura et al. | B65H 1/04 |
| 2011/0216380 A1* | 9/2011 | Sato | H04N 1/04 358/505 |

(Continued)

FOREIGN PATENT DOCUMENTS

| | | |
|---|---|---|
| JP | 4128658 | 7/2008 |
| JP | 4492657 | 6/2010 |
| JP | 6029630 | 11/2016 |

*Primary Examiner* — Negussie Worku
(74) *Attorney, Agent, or Firm* — Venable LLP

(57) ABSTRACT

An image scanning apparatus comprises a pair of regulating members that regulates a position of the document sheet stacked on a stacking unit, at least one of the regulating members being movable in a width direction; and units that detects a length in the width direction between the regulating members, and detects the width of the document sheet conveyed by a conveyance unit; wherein in a case where a difference between the detected length and the detected width of a document sheet is smaller than a threshold, a first sheet-to-sheet interval is set, and in a case where the difference between the detected length and the detected width of the document sheet is larger than the threshold, a second sheet-to-sheet interval which is larger than the first sheet-to-sheet interval is set.

15 Claims, 16 Drawing Sheets

(56) References Cited

U.S. PATENT DOCUMENTS

| | | | |
|---|---|---|---|
| 2015/0207941 A1* | 7/2015 | Koda | H04N 1/0079 |
| | | | 358/3.26 |
| 2017/0041478 A1* | 2/2017 | Nakayoshi | H04N 1/00801 |
| 2017/0060493 A1* | 3/2017 | Furukawa | G03G 15/234 |
| 2017/0070619 A1* | 3/2017 | Hamada | H04N 1/00076 |
| 2018/0048786 A1* | 2/2018 | Sunada | H04N 1/00588 |
| 2018/0167519 A1* | 6/2018 | Nakajima | G06F 8/71 |
| 2018/0220021 A1* | 8/2018 | Arimori | H04N 1/00602 |
| 2018/0220027 A1* | 8/2018 | Kusuhata | G03B 27/62 |
| 2018/0281478 A1* | 10/2018 | Oguchi | B41J 13/0009 |
| 2019/0052767 A1* | 2/2019 | Nagano | H04N 1/00588 |
| 2019/0100393 A1* | 4/2019 | Shiozawa | B65H 3/0669 |
| 2019/0100398 A1* | 4/2019 | Nakayoshi | B65H 7/20 |
| 2019/0199874 A1* | 6/2019 | Oka | H04N 1/00708 |
| 2019/0238703 A1* | 8/2019 | Seki | H04N 1/00801 |

* cited by examiner

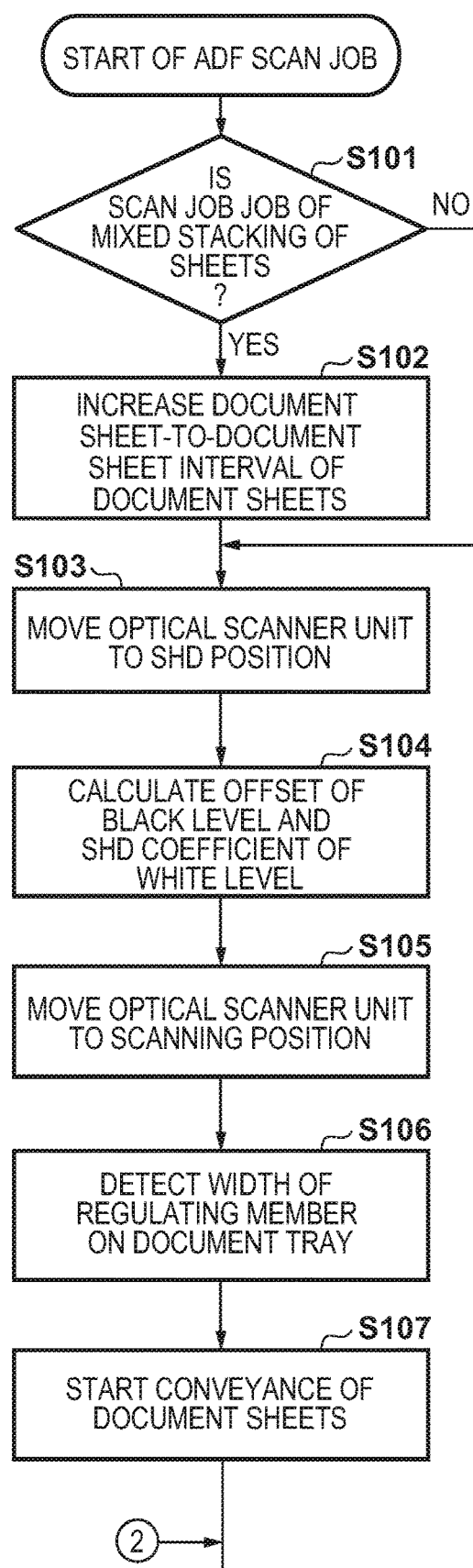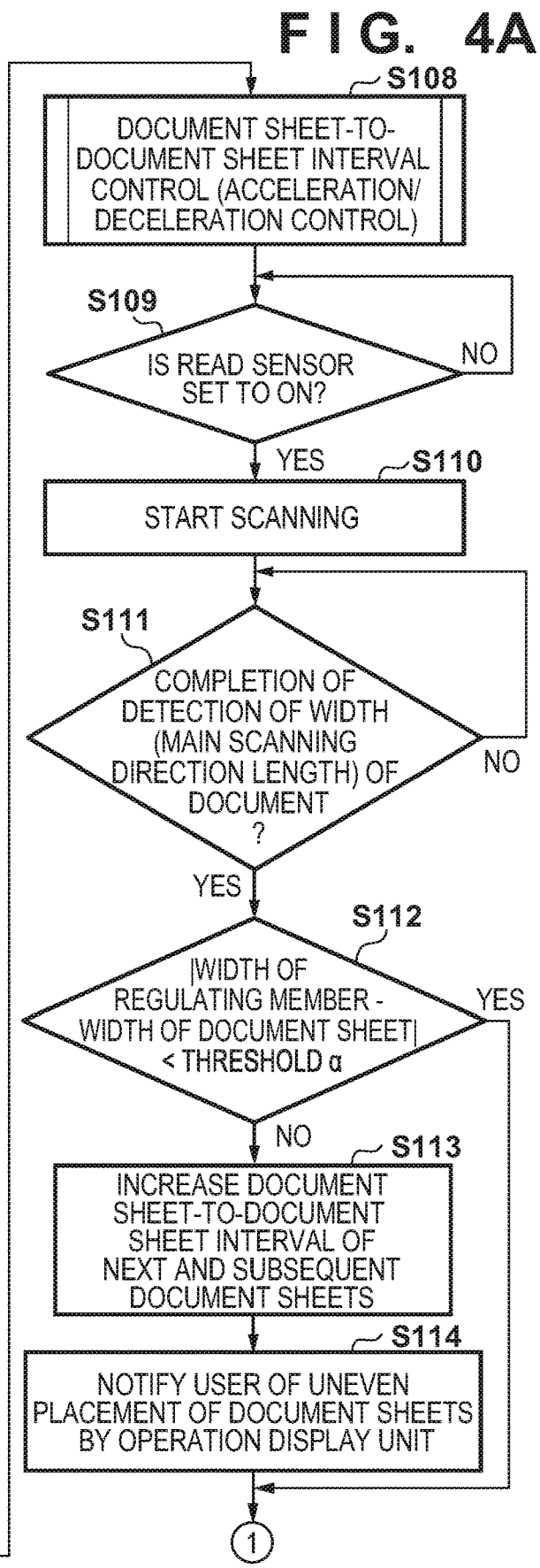
FIG. 4A

FIG. 7

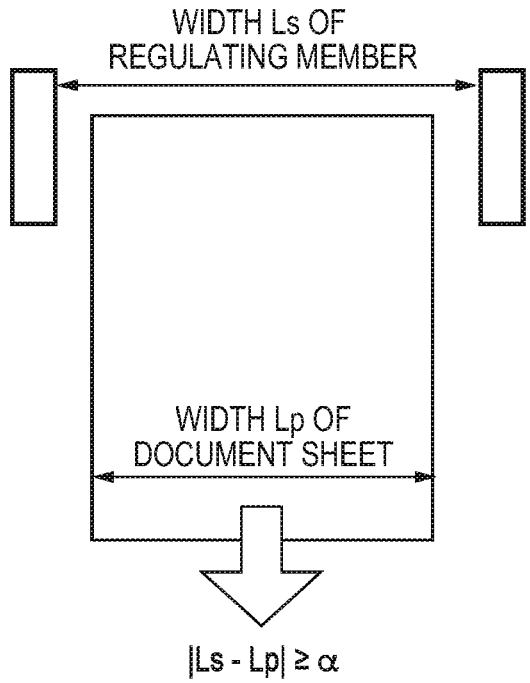

WIDTH Ls OF REGULATING MEMBER

WIDTH Lp OF DOCUMENT SHEET $|Ls - Lp| \geq \alpha$
CONDITION IN WHICH DOCUMENT BUNDLE IS DETERMINED TO BE SET AS UNEVEN STACKING OF SHEETS $|Ls - Lp| < \alpha$
CONDITION IN WHICH DOCUMENT BUNDLE IS DETERMINED TO BE SET AS NORMAL STACKING OF SHEETS

AUTOMATIC DOCUMENT FEEDER (ADF) HAS DETECTED THE WIDTH OF THE DOCUMENT TRAY AND THE SIZE OF DOCUMENT SHEETS ARE MISMATCHED.

THE DOCUMENT SHEETS CAN BE CONVEYED STRAIGHT BY SETTING THE DOCUMENT SHEETS PLACED ON THE DOCUMENT TRAY SO THAT THE DOCUMENT SHEETS ARE SANDWICHED BY THE GUIDING PLATE.

OK

PLACEMENT OF STANDARD SHEETS

BOTH SIDES ARE REGULATED

RECOMMENDED PLACEMENT OF MIXED STACKING OF SHEETS WITH DIFFERENT WIDTHS

ONE SIDE IS NOT REGULATED

UNEVEN PLACEMENT OF STANDARD SHEETS

BOTH SIDES ARE NOT REGULATED

UNEVEN PLACEMENT OF MIXED STACKING OF SHEETS WITH DIFFERENT WIDTHS

BOTH SIDES ARE NOT REGULATED

IMAGE SCANNING APPARATUS AND CONTROL METHOD THEREOF

BACKGROUND OF THE INVENTION

Field of the Invention

The present invention relates to an image scanning apparatus and a control method thereof.

Description of the Related Art

In an image scanning apparatus, scanning target document sheets are continuously conveyed, sheet by sheet, by a so-called automatic document feeder (to be abbreviated as "ADF" hereinafter). In general, a scan operation of obtaining image data by optically scanning images from the document sheets is performed.

When scanning a document sheet by the ADF, in some cases, the size of the document sheet may be detected on a tray on which the document bundle is placed, and a scan image region corresponding to the detected size may be scanned. By using the size of the document sheet detected on the tray, it is possible to proceed with processing operations such as the determination of the printer sheet feeding stage and the like, and thus productivity, which is determined by the number of scanned sheets per unit time, and FCOT (First Copy Output Time) can be improved.

In addition, the execution of skew correction is generally proposed in cases in which the leading edge of a document sheet is not parallel to (is skewed with respect to) the main scanning direction of the image scanning apparatus. There is proposed a technique of generating a sheet feed timing based on a skew amount and a detection result from a document sheet-to-document sheet interval detection unit to improve productivity (Japanese Patent No. 4128658).

However, there are cases in which the sheet-to-sheet interval cannot be decreased by changing the sheet feed timing. For example, a defect may be generated in the scanned image if the sheet-to-sheet interval is decreased more than necessary. Also, the sheet-to-sheet interval may not be decreased, for example, in a case in which a document bundle has been placed unevenly and in a case in which a plurality of sheets with different document sizes are mixed and placed (in a mixed stacking state) on the tray. For a case in which a document bundle is placed unevenly and a case in which the width of the document tray and the width of a document sheet on a conveyance path are detected and the actual width of the document sheet is different from the size predicted on the document tray, there is a technique in which the operation is suspended so that the conveyance of the document can be restarted by estimating the placement of document sheets with different widths (Japanese Patent No. 4492657). On the other hand, for a case in which a regulating member, which is set as a member that prevents the document sheet from skewing, of the document tray has not been set appropriately, there is a technique in which the sheet feed operation is stopped and a user is prompted to reset the regulating member (Japanese Patent No. 6029630).

In the technique disclosed in Japanese Patent No. 4492657, suspending the document sheet scanning operation and requesting the user to restart the operation again may be burdensome for the user. Furthermore, the technique disclosed in Japanese Patent No. 6029630 may feel burdensome for a user who is in a hurry to complete the scanning of the document sheet. That is, the ease of use is degraded when the scanning of the document sheet is suspended frequently.

SUMMARY OF THE INVENTION

In consideration of the above problem, the present invention provides an image scanning apparatus that is easy to use and can suppress degradation in productivity while preventing the occurrence of a defective image.

According to one aspect of the present invention, there is provided an image scanning apparatus comprising: a stacking unit on which a document sheet is to be stacked; a pair of regulating members configured to regulate a position of the document sheet stacked on the stacking unit, at least one of the regulating members being movable in a width direction perpendicular to a conveyance direction of the document sheet; a conveyance unit configured to convey the document sheet stacked on the stacking unit; a scanning unit configured to scan an image on the document sheet conveyed by the conveying unit; a first detecting unit configured to detect a length in the width direction between the regulating members; a second detecting unit configured to detect the width of the document sheet conveyed by the conveyance unit; and a control unit configured to control a sheet-to-sheet interval when document sheets are to be conveyed by the conveyance unit, wherein in a case where a difference between the length detected by the first detecting unit and the width of a document sheet detected by the second detecting unit is smaller than a threshold, the control unit sets a first sheet-to-sheet interval as the sheet-to-sheet interval when the document sheets are to be conveyed, and in a case where the difference between the length detected by the first detecting unit and the width of the document sheet detected by the second detecting unit is larger than the threshold, the control unit sets a second sheet-to-sheet interval which is larger than the first sheet-to-sheet interval as the sheet-to-sheet interval when the document sheets are to be conveyed.

According to another aspect of the present invention, there is provided an image scanning apparatus comprising: a stacking unit on which the document sheet is to be stacked; a pair of regulating members configured to regulate a position of the document sheet stacked on the stacking unit, at least one of the regulating members being movable in a width direction perpendicular to a conveyance direction of the document sheet; a conveyance unit configured to convey the document sheet stacked on the stacking unit; a scanning unit configured to scan an image on the document sheet conveyed by the conveying unit; a detecting unit configured to detect a length in the width direction between the regulating members; and a control unit configured to control a sheet-to-sheet interval when document sheets are to be conveyed by the conveyance unit, wherein the control unit specifies, based on the length detected by the detecting unit, a width of the document sheet to be conveyed by the conveyance unit, the control unit sets, in a case where a difference between the length detected by the detecting unit and the specified width of the document sheet is smaller than a threshold, a first sheet-to-sheet interval when document sheets are to be conveyed, and the control unit sets, in a case where the difference between the length detected by the detecting unit and the specified width of the document sheet is larger than the threshold, a second sheet-to-sheet interval which is larger than the first sheet-to-sheet interval as the sheet-to-sheet interval when the document sheets are to be conveyed.

According to another aspect of the present invention, there is provided a method of controlling an image scanning apparatus comprises a stacking unit on which a document sheet is to be stacked, a pair of regulating members configured to regulate a position of the document sheet stacked on the stacking unit, at least one of the regulating members being movable in a width direction perpendicular to a conveyance direction of the document sheet, a conveyance unit configured to convey the document sheet stacked on the stacking unit, a scanning unit configured to scan an image on the document sheet conveyed by the conveying unit, a first detecting unit configured to detect a length in the width direction between the regulating members, and a second detecting unit configured to detect the width of the document sheet conveyed by the conveyance unit, the method comprising: setting a first sheet-to-sheet interval as the sheet-to-sheet interval when the document sheets are to be conveyed in a case where a difference between the length detected by the first detecting unit and the width of a document sheet detected by the second detecting unit is smaller than a threshold, and setting a second sheet-to-sheet interval which is larger than the first sheet-to-sheet interval as the sheet-to-sheet interval when the document sheets are to be conveyed in a case where the difference between the length detected by the first detecting unit and the width of the document sheet detected by the second detecting unit is larger than the threshold.

According to another aspect of the present invention, there is provided a method of controlling an image scanning apparatus comprises a stacking unit on which the document sheet is to be stacked, a pair of regulating members configured to regulate a position of the document sheet stacked on the stacking unit, at least one of the regulating members being movable in a width direction perpendicular to a conveyance direction of the document sheet, a conveyance unit configured to convey the document sheet stacked on the stacking unit, a scanning unit configured to scan an image on the document sheet conveyed by the conveying unit, and a detecting unit configured to detect a length in the width direction between the regulating members, the method comprising specifying, based on the length detected by the detecting unit, a width of the document sheet to be conveyed by the conveyance unit, setting, in a case where a difference between the length detected by the detecting unit and the specified width of the document sheet is smaller than a threshold, a first sheet-to-sheet interval when document sheets are to be conveyed, and setting, in a case where the difference between the length detected by the detecting unit and the specified width of the document sheet is larger than the threshold, a second sheet-to-sheet interval which is larger than the first sheet-to-sheet interval as the sheet-to-sheet interval when the document sheets are to be conveyed.

The present invention can provide an image scanning apparatus that is easy to use and can suppress degradation in productivity while preventing the occurrence of a defective image.

Further features of the present invention will become apparent from the following description of exemplary embodiments with reference to the attached drawings.

BRIEF DESCRIPTION OF THE DRAWINGS

FIGS. 4A and 4B are flowcharts of a document sheet scanning operation according to the first embodiment;
FIG. 7 is a view for explaining the conditions used for determining uneven stacking of sheets;
FIG. 8 is a view showing an example of the arrangement of a display screen at the detection of a size abnormality.

DESCRIPTION OF THE EMBODIMENTS

First Embodiment

An example of the arrangement of an image scanning apparatus according to an embodiment of the present invention will be described hereinafter with reference to the accompanying drawings.

Figure 1:
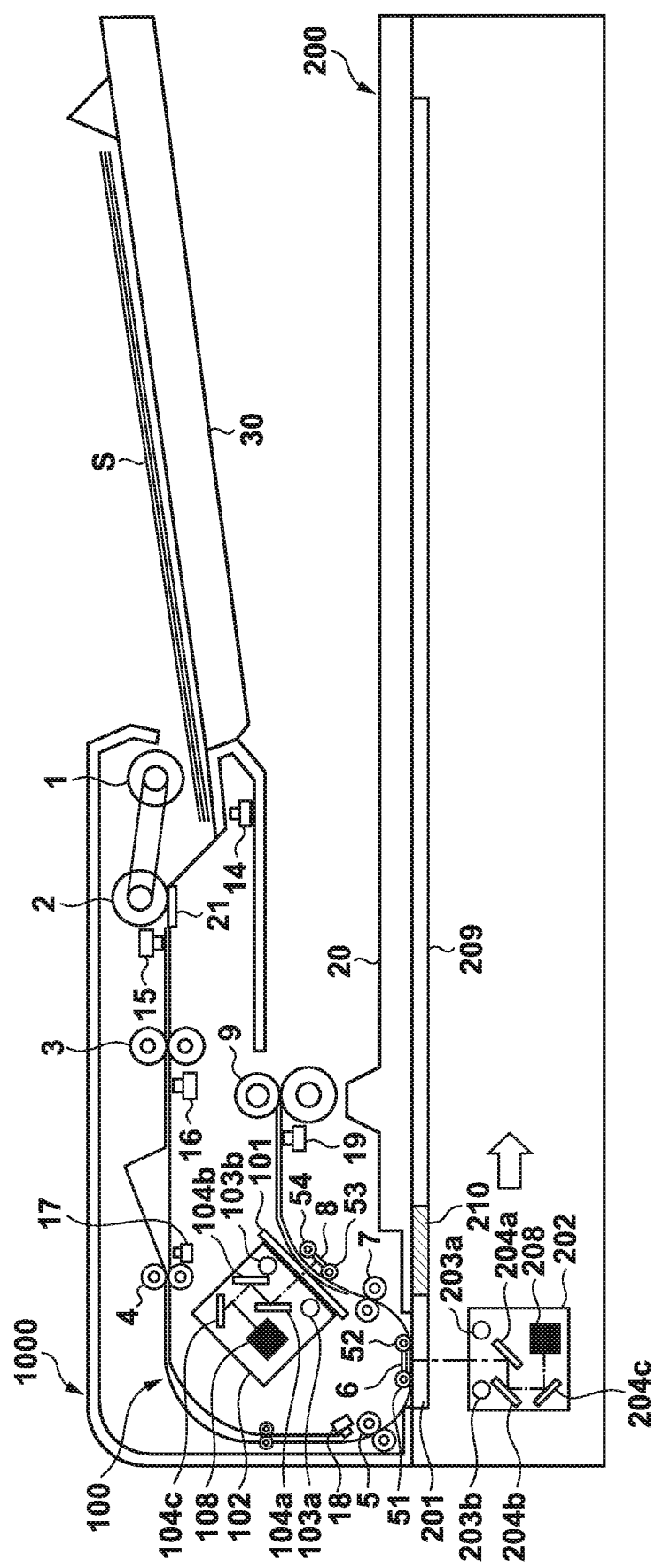
FIG. 1 is a sectional view of an image scanning apparatus according to the present invention.

FIG. 1 is a sectional view showing an example of an image scanning apparatus that includes an ADF according to this embodiment. An image scanning apparatus 1000 includes an image scanning unit 200 that scans an image of a document sheet and an automatic document feeder (ADF) 100. Furthermore, controller units (to be described later with reference to FIG. 3) are connected to the image scanning apparatus 1000. Note that although the image scanning apparatus will be exemplified in the following explanation, the present invention may be used in an apparatus such as, for example, a multi-function peripheral (MFP) or the like. It may also be applied to a document conveyance device which is attached externally to an image scanning unit.

[Arrangement Example of Image Scanning Unit]

The image scanning unit 200 will be described with reference to FIG. 1. In the case of a document sheet set on a document placement glass 209, the image scanning unit 200 can scan (fixed scan), line by line, image information recorded on the document sheet by scanning an optical scanner unit 202 at a constant speed in a sub-scanning direction indicated by an arrow in FIG. 1. In the case of a document sheet on the ADF 100, the optical scanner unit 202 is moved so as to be positioned at the center of an obverse surface glass facing member 6 of the ADF 100, and the document sheet, which is fed and conveyed by a method to be described later, is optically scanned (flow scan). In addition, the image scanning apparatus 1000 optically scans an image on the reverse surface of a document sheet without inverting the document sheet in the conveyance path by using an optical scanner unit 102.

[Arrangement Example of Automatic Document Feeder (ADF)]

The operation of the ADF 100 will be described with reference to FIG. 1. The ADF 100 shown in FIG. 1 includes a document tray 30 as a placement unit for stacking a document bundle S which is formed from at least one or more document sheets, a separation upper roller 2 and a separation pad 21 that regulate the document bundle S from protruding from the document tray 30 and progressing downstream before the start of the conveyance of the document sheet, and a feed roller 1. A document absence/presence detection sensor 14 is included in the document tray 30, and it is arranged so that the absence/presence of a document sheet on the document tray 30 can be determined in accordance with the detection result of the document absence/presence detection sensor 14. Here, note that the upper side of a document sheet stacked on the document tray 30 will be described as the obverse surface. The feed roller 1 falls to the document surface of the document bundle S, which is stacked on the document tray 30, and performs a rotation operation. This causes the uppermost document sheet of the document bundle S to be fed. The uppermost document sheet of the document bundle fed by the feed roller 1 is separated from the document bundle and conveyed by the action of the separation upper roller 2 and the separation pad 21. A known separation technique is used in this separation operation, and thus a detailed description will be omitted here.

A document sheet separated by the separation upper roller 2 and the separation pad 21 is conveyed to registration rollers 4 by pullout rollers 3, and the document sheet is abutted against the registration rollers 4. This warps the document sheet into a loop-like form, thereby cancelling the skew caused during the conveyance of the document sheet. Note that a registration function may be performed by performing a rotation correction on an optically read image by a known technique. A sheet feeding path for conveying the document sheet that has passed the registration rollers 4 in the direction of a flow scan glass 201 is arranged in the downstream side of the conveyance direction of the registration rollers 4.

The document sheet sent to the feeding path is conveyed by read rollers 5 to an obverse surface image scanning position. When the document sheet passes between the flow scan glass 201 and the obverse surface glass facing member 6, the obverse surface of the document sheet is irradiated by LEDs 203a and 203b. The reflected light is deflected by a plurality of mirrors 204a, 204b, and 204c, and the obverse surface image of the document sheet is scanned line by line by an image scanning sensor 208. If the obverse surface image of the document sheet is to be scanned, the document sheet conveyed by conveyance rollers 7 is made to pass a sheet discharge sensor 19 and conveyed to a sheet discharge tray 20 by sheet discharge rollers 9.

If the reverse surface image of the document sheet is to be also scanned, the document sheet is conveyed to an image scanning position on a reverse surface glass facing member 8 and scanned by the optical scanner unit 102 after the obverse surface image has been scanned. When the document sheet passes between a flow scan glass 101 and the reverse surface glass facing member 8, the obverse surface of the document sheet is irradiated with LEDs 103a and 103b. The reflected light is deflected by a plurality of mirrors 104a, 104b, and 104c, and the reverse surface image of the document sheet is scanned line by line by an image scanning sensor 108. By conveying the document sheet in the same manner as the conveyance operation described above, the reverse surface image of the document sheet can be scanned. Note that the optical scanner unit 202 for scanning the obverse surface of the document sheet and the optical scanner unit 102 for scanning the reverse surface of the document sheet may have the same arrangement or different arrangements.

[Explanation of Sectional View of Upper Portion of Automatic Document Feeder (ADF)]

Figure 2:
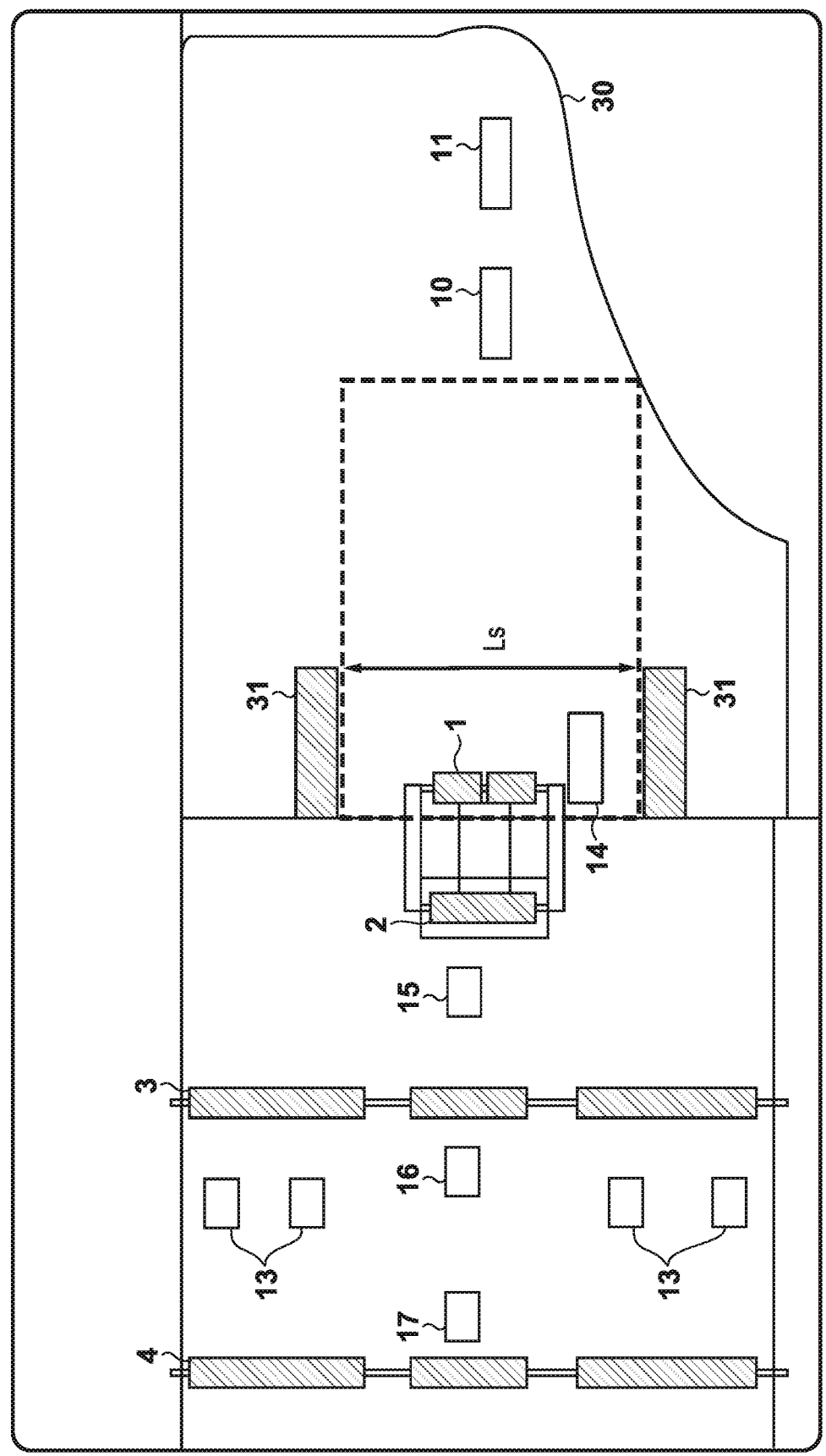
FIG. 2 is a view in which the image scanning apparatus according to the present invention is viewed from above.

The sectional view of the upper portion of the ADF 100 will be described with reference to FIG. 2. When a document sheet (A4 vertical) indicated by a broken line portion in FIG. 2 is placed on the document tray 30, a document guiding plate 31, serving as a regulating member, regulates the document sheet in a main scanning direction (a direction perpendicular to the conveyance direction). The document guiding plate 31 is arranged so as to be movable in the main scanning direction and to sandwich the document sheet in the main scanning direction. Although an example in which the document sheet is regulated so as to be positioned at the center of the document tray 30 in the main scanning direction is shown here, the present invention is not limited to this, and it may be arranged so that the document sheet is positioned on one side. Furthermore, the shape of the document guiding plate 31 is not limited to a plate shape. The length of the document sheet in the main scanning direction will be described as the width of the document sheet here.

The document absence/presence detection sensor 14 can detect the presence/absence of the document placed on the document tray 30. The approximate size of the document sheet in the sub-scanning direction (conveyance direction) placed on the document tray 30 can be obtained by document length sensors 10 and 11 on the document tray 30. Note that the arrangement positions and the number of the document length sensors 10 and 11 and the document absence/presence detection sensors 14 to be arranged are not limited to those shown in FIG. 2, and may be changed in accordance with the size of the document sheet or the like supported by the ADF 100.

The document sheet fed by the feed roller 1 is sequentially conveyed to the separation upper roller 2, a post-separation sensor 15, the pullout rollers 3, a post-pullout sensor 16, a registration sensor 17, and the registration rollers 4. Note that conveyance path width sensors 13 can detect the width of the document sheet conveyed on the conveyance path.

[Explanation of Control Unit]

Figure 3:
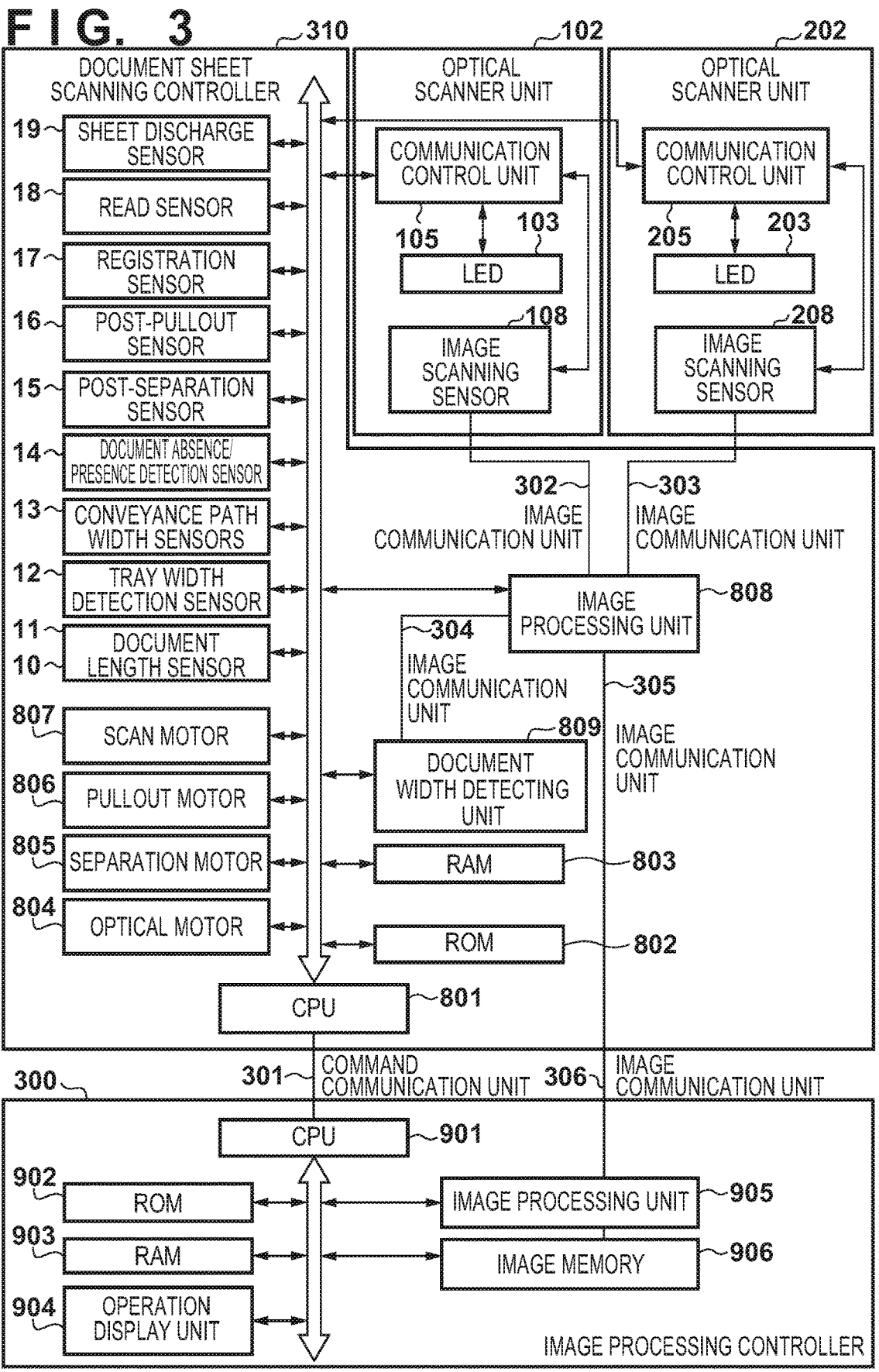
FIG. 3 is a block diagram showing an example of the arrangement of the image scanning apparatus according to the present invention.
Figure 4B:
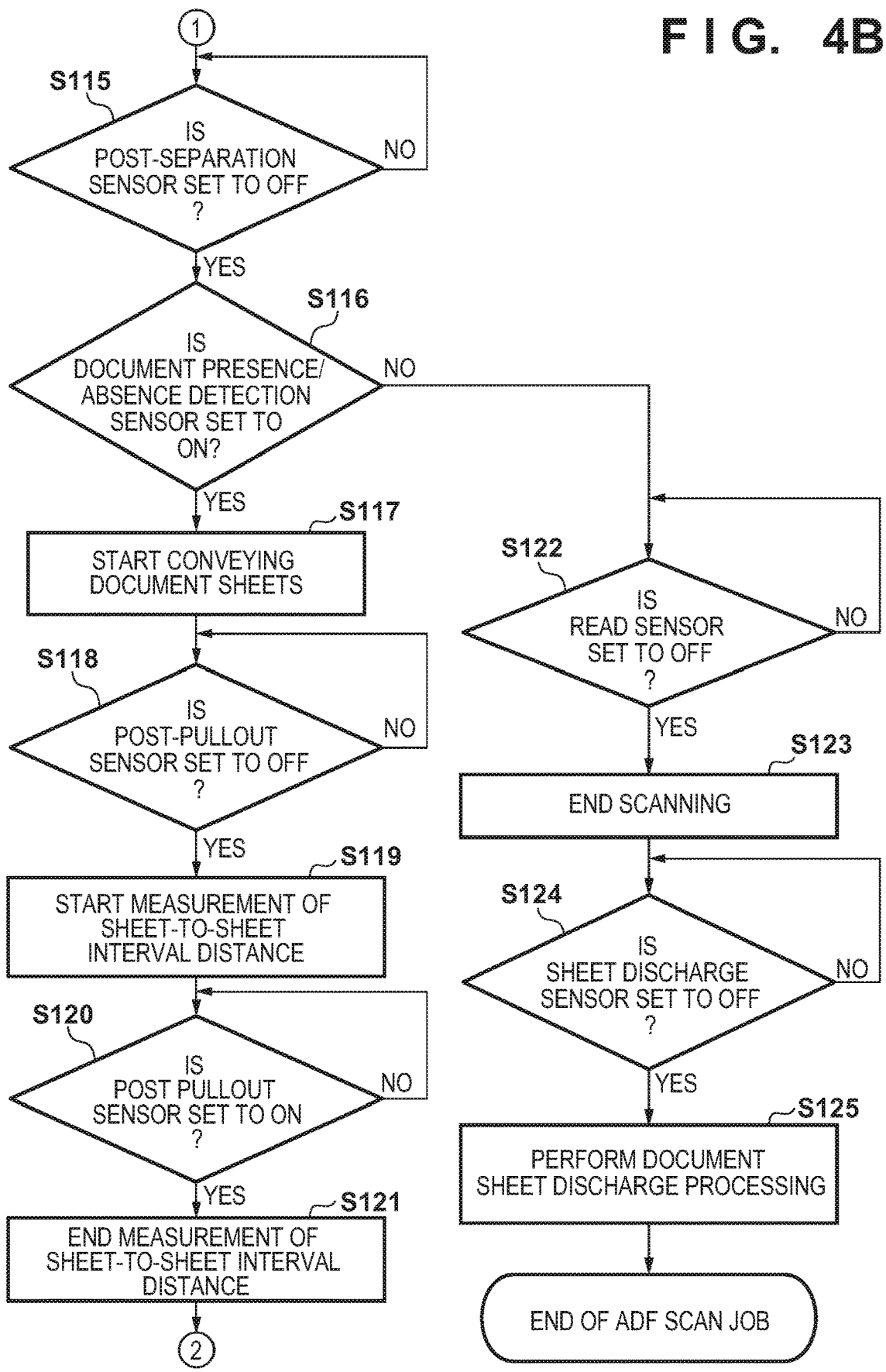

FIG. 3 is a view showing an example of the arrangement of the control unit of the image scanning apparatus 1000, which includes the ADF 100, according to this embodiment. In this embodiment, the control unit includes an image processing controller 300 and a document sheet scanning controller 310. The document sheet scanning controller 310 includes a CPU 801 which is a central processing unit, a ROM 802 which is a read-only memory, and a RAM 803 which is a random access memory. The ROM 802 stores various kinds of control programs, and the RAM 803 stores input data and work data. In this embodiment, the operations of respective flowcharts (to be described later) are implemented by the CPU 801 reading out and executing corresponding control programs.

A separation motor 805, a pullout motor 806, and a scan motor 807 are controllably connected to the CPU 801. A document conveyance function is implemented by controlling these motors. The feed roller 1 and the separation upper roller 2 are rotated and driven by the separation motor 805. The pullout rollers 3 and the registration rollers 4 are rotated and driven by the pullout motor 806. The read rollers 5, an obverse surface scan upstream roller 51, an obverse surface scan downstream roller 52, the conveyance rollers 7, a reverse surface scan upstream roller 53, a reverse surface scan downstream roller 54, and the sheet discharge rollers 9 are driven by the scan motor 807.

The document absence/presence detection sensor 14, the post-separation sensor 15, the post-pullout sensor 16, the registration sensor 17, a read sensor 18, the sheet discharge sensor 19, the conveyance path width sensors 13, and a tray width detection sensor 12 are communicably connected to the CPU 801. The document absence/presence detection sensor 14 detects the document sheets stacked on the document tray 30. The post-separation sensor 15 detects the edge of each document sheet on the sheet conveyance path. The tray width detection sensor 12 detects the width of the document sheet on the document tray 30. The conveyance path width sensors 13 detect the width of the document sheet in the main scanning direction on the conveyance path.

An optical motor 804, the separation motor 805, the pullout motor 806, and the scan motor 807 are pulse motors, and the CPU 801 manages the number of revolutions of each motor by counting and controlling the number of driving pulses. The CPU 801 counts the number of driving pulses of the separation motor 805 from the timing at which the post-pullout sensor 16 is set to ON until the timing at which the post-pullout sensor is set to OFF during the conveyance of the document sheet. The conveyance amount of the document sheet can be detected based on the number of pulses that the separation motor 805 has been driven and the advancement amount per pulse of a gear (gear ratio) that transmits the driving of the separation motor 805 to the separation upper roller 2. Hence, the CPU 801 can detect the length of the conveyed document sheet by counting the number of driving pulses of the separation motor 805. Furthermore, the CPU 801 can detect the length (sheet-to-sheet interval) between document sheets during the conveyance operation by counting the number of driving pulses of the separation motor 805 from the timing at which the post-pullout sensor 16 is set to ON until the timing at which the post-pullout sensor is set to OFF during the conveyance of the document sheets.

The length of the document sheet can be determined by using the document length sensors 10 and 11 even in a state in which the document sheet is placed on the document tray 30. For example, let 0 be the leading edge position of a document sheet in a state in which the document sheet has been placed on the document tray 30. In the example of FIG. 2, in the portion indicated by a broken line, the position (side) of the broken line on the left is the leading edge position O of the document. Assume that the distance from the leading edge position O of the document sheet to the detection position of the document length sensor 10 is 220 [mm] and the distance from the leading edge position O of the document sheet to the detection position of the document length sensor 11 is 330 [mm]. In this case, when both the document length sensor 10 and the document length sensor 11 are OFF, it can be determined that the length of the document sheet in the conveyance direction (sub-scanning direction) is less than 220 [mm]. When the document length sensor 10 is ON and the document length sensor 11 is OFF, it can be determined that the length of the document sheet in the conveyance direction (sub-scanning direction) is 220 [mm] (inclusive) to 330 [mm] (exclusive). When both the document length sensor 10 and the document length sensor 11 are ON, it can be determined that the length of the document sheet in the conveyance direction (sub-scanning direction) equal to or longer than 330 [mm].

The CPU 801 determines the size of the document sheet by combining the length of the document sheet detected during conveyance and on the document tray 30 by the above described sensors and the information of the width of the document sheet which is detected by the tray width detection sensor 12. As described above, the arrangement positions and the number of the document length sensors are not limited to those in the arrangement shown in FIG. 2 and may be changed in accordance with the type of the document and the like supported by the image scanning apparatus 1000.

In order to implement the image scanning function on the obverse surface of the document sheet, the LEDs 203 and the image scanning sensor 208 to be mounted on the optical scanner unit 202 are connected to the CPU 801 via a communication control unit 205. In addition, in order to implement the image scanning function on the reverse surface of the document sheet, the LEDs 103 and the image scanning sensor 108 to be mounted on the optical scanner unit 102 are connected to the CPU 801 via a communication control unit 105. The CPU 801 performs shading processing and various kinds of filter processing operations on the sets of image data scanned by the image scanning sensor 108 and the image scanning sensor 208 in an image processing unit 808 to which the sensors are connected via image communication units 302 and 303, respectively. The CPU 801 subsequently transmits the image data that has undergone various kinds of processing to the image processing controller 300 via an image communication unit 306.

The CPU 801 notifies, in accordance with the document sheet scanning timing, the image processing controller 300 via the image communication unit 306 of a vertical synchronization signal, which serves as a reference of the leading edge of the document image data, and a horizontal synchronization signal, which serves as a reference of the leading edge pixel of one line.

The image processing controller 300 includes a CPU 901, a ROM 902, and a RAM 903. The image processing controller 300 exchanges data related to image scanning control with the CPU 801 via a command communication unit 301. Each set of image data processed in the image processing unit 808 is transferred to an image processing unit 905 in the image processing controller 300 via the image communication unit 306. The image data undergoes predetermined image processing operations, such as color determination and the like, in the image processing unit 905 and is stored in an image memory 906. The image processing controller 300 includes an operation display unit 904. User interface control is performed by the CPU 901 via the operation display unit 904. Note that the CPU 901 receives the information input by a user via the operation display unit 904 and processes the input information such as that indicating the start of a scan job or the like.

[Document Sheet-to-Document Sheet Interval Control at Detection of Uneven Document Sheets]

In a case in which document sheets stacked on the ADF 100 are to be conveyed and scanned, document sheet-to-document sheet interval control applying the present invention and is performed at the time of the detection of unevenly stacked document sheets will be described with reference to the drawings. Note that since the same control operation will be performed when both surfaces of the document sheet are to be scanned, an example in which one surface of the document sheet is scanned will be used to describe the control operation in this embodiment.

Document sheet-to-document sheet interval control in a case in which an uneven document bundle is placed on the document tray 30 will be described with reference to the flowcharts shown in FIGS. 4A to 5B. The operations of the flowcharts shown in FIGS. 4A to 5B are implemented by the CPU 801 reading out instructions stored in the ROM 802 as temporary data to the RAM 803 and executing the readout instructions. FIGS. 6A to 6J show the document conveyance states when document sheets are conveyed in accordance with the flowcharts shown in FIGS. 4A to 5B. Here, the control operation will be described by showing the specific document conveyance states.

First, the CPU 901 receives information (an instruction) input via the operation display unit 904 by the user, and notifies the CPU 801 of the start of a scan job by the ADF 100.

In step S101, the CPU 801 determines whether the scan job is a job of mixed stacking of sheets with different widths. This job of mixed stacking of sheets with different widths represents a job in which a plurality of document sheets that have a plurality of different sheet sizes will be scanned. The placement of document sheets that have different widths on the document tray 30 will be referred to as "mixed stacking of sheets with different widths". In the case of a job of mixed stacking of sheets with different widths, since one side or both sides of the document sheets are not regulated, placement states such as those shown in FIGS. 10B and 10D may be obtained. Note that in a case in which document sheets that have the same width are stacked on the document tray 30, both sides of the document sheets are regulated by the document guiding plate 31, and a state such as that shown in FIG. 10A can be obtained. If the scan job is a job of mixed stacking of sheets with different widths (YES in step S101), the process advances to step S102. Otherwise (NO in step S101), the process advances to step S103.

In step S102, the CPU 801 executes setting to increase the sheet-to-sheet interval between the document sheets. The sheet-to-sheet interval between the document sheets indicates the distance between the trailing edge of a document sheet and the leading edge of a document sheet to be conveyed next in the document sheet scanning portion, that is, near the center of the obverse surface glass facing member 6. For example, in the case in which 40 [mm] is preset for standard-sized sheets as a default value of the sheet-to-sheet interval, the interval is doubled to 80 [mm] by executing the setting to increase the sheet-to-sheet interval. By executing this setting, it is possible to prevent, even if the document sheet is skewed, the trailing edge of the currently scanned document sheet and the leading edge of the document sheet to be scanned next from overlapping each other in the scanning portion. Note that in a case in which the scan job is not a job of mixed stacking of sheets with different widths, the setting to increase the sheet-to-sheet interval is not executed, and the sheet-to-sheet interval setting will remain as the default value of 40 [mm]. Note that the default value of the sheet-to-sheet interval and the value of the sheet-to-sheet interval after the execution of the setting to increase the sheet-to-sheet interval are not limited to those described above, and other values may be used. For example, the values may be determined in accordance with the size of the document sheets to be conveyed or in accordance with the combination of the mixed-stacked document sheets.

In step S103, the CPU 801 moves the optical scanner unit 202 to a shading position. In the move to the shading position, the optical motor 804 is rotated and driven to move the optical scanner unit 202 to a position where the luminance scanned by a shading white plate 210 is stabilized.

In step S104, the CPU 801 calculates the offset of the black level and the shading coefficient of the white level by scanning the shading white plate 210 by the optical scanner unit 202. At the time of an image scanning operation, the luminance value obtained from the scanning of the shading white plate 210 is multiplied by the shading coefficient of the white level which was obtained in this process, and the offset of the black level is added to the product. In this processing, assume that a known shading correction control operation will be used, and a detailed description will be omitted.

In step S105, the CPU 801 moves the optical scanner unit 202 to a scanning position. In the move to the scanning position, the optical motor 804 is rotated and driven to move the optical scanner unit 202 to a position below the obverse surface flow scan glass 201.

In step S106, the CPU 801 obtains the length (to be referred to as the width of the regulating member hereinafter) of the document sheet in the main scanning direction which is regulated by the document guiding plate 31 on the document tray 30. The width of the regulating member on the document tray 30 can be detected by the tray width detection sensor 12 and corresponds to a width indicated by a reference symbol Ls in FIG. 2. The value obtained by the tray width detection sensor 12 is a value roughly representing the width of the document sheet in the main scanning direction, and the value does not necessarily match the actual width of the document sheet in the main scanning direction. For example, in an uneven document sheet placement state as that shown in FIG. 10C, the value obtained by the tray width detection sensor 12 does not match the actual width of each document.

Figure 6A:
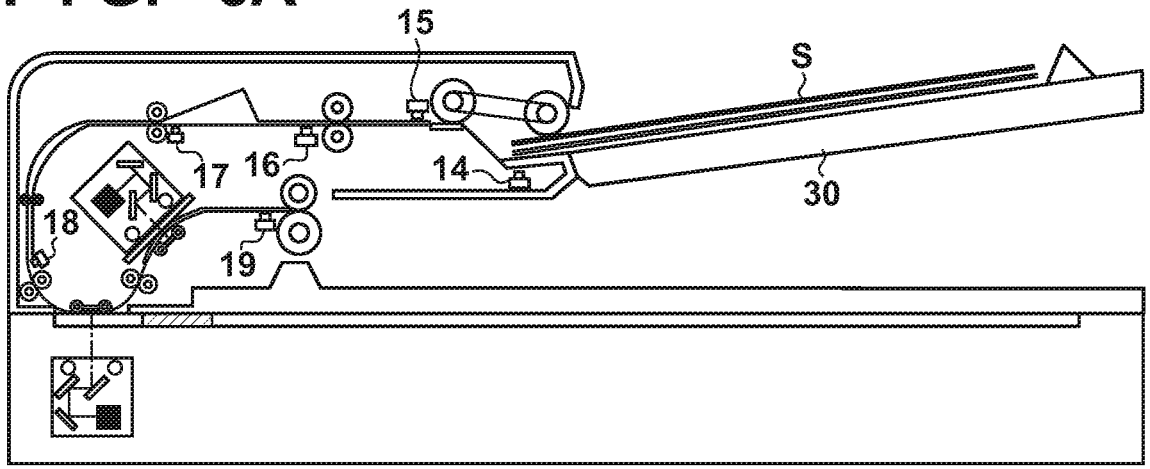
FIGS. 6A to 6J are schematic views of the conveyance of a document bundle S in the image scanning apparatus.
Figure 6B:
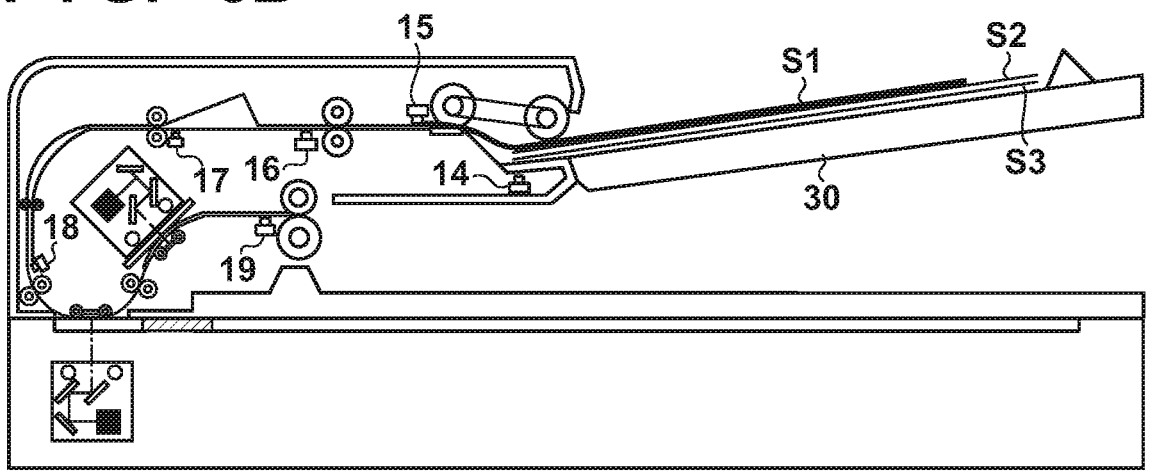
Figure 6C:
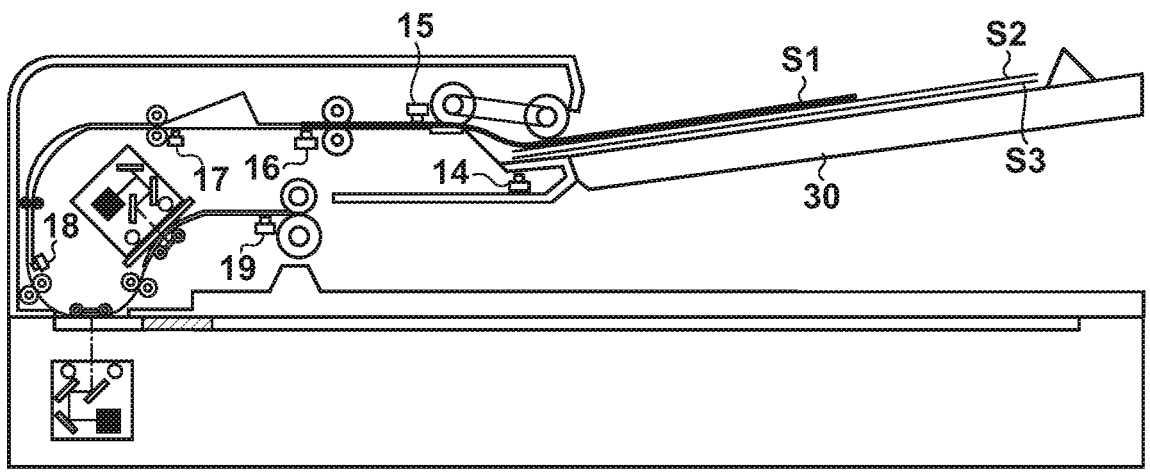
Figure 6D:
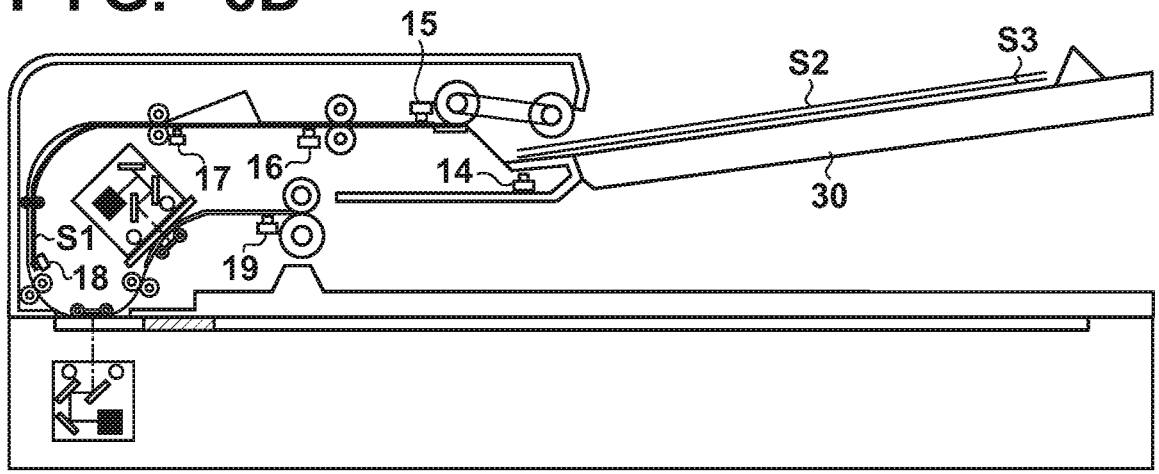

In step S107, the CPU 801 starts the conveyance of the document sheets. FIG. 6A shows the document sheet placement state at the start of the conveyance of a document bundle S. FIG. 6B shows a state in which the post-separation sensor 15 has been set to ON by the passing of the leading edge of a document sheet S1.

The CPU 801 causes the separation motor 805, the pullout motor 806, and the scan motor 807 to be driven so as to sequentially convey each document sheet to the feed roller 1, the separation upper roller 2, the pullout rollers 3, the registration rollers 4, the read rollers 5, the obverse surface scan upstream roller 51, the obverse surface scan downstream roller 52, the conveyance rollers 7, the reverse surface scan upstream roller 53, the reverse surface scan downstream roller 54, and the sheet discharge rollers 9. Note that all of the motors on the conveyance path need not be simultaneously driven at the start of the conveyance of the document sheet, and each motor need only be rotating stably before until the leading edge of the document sheet reaches the corresponding roller to which the motor is connected.

Figure 5A:
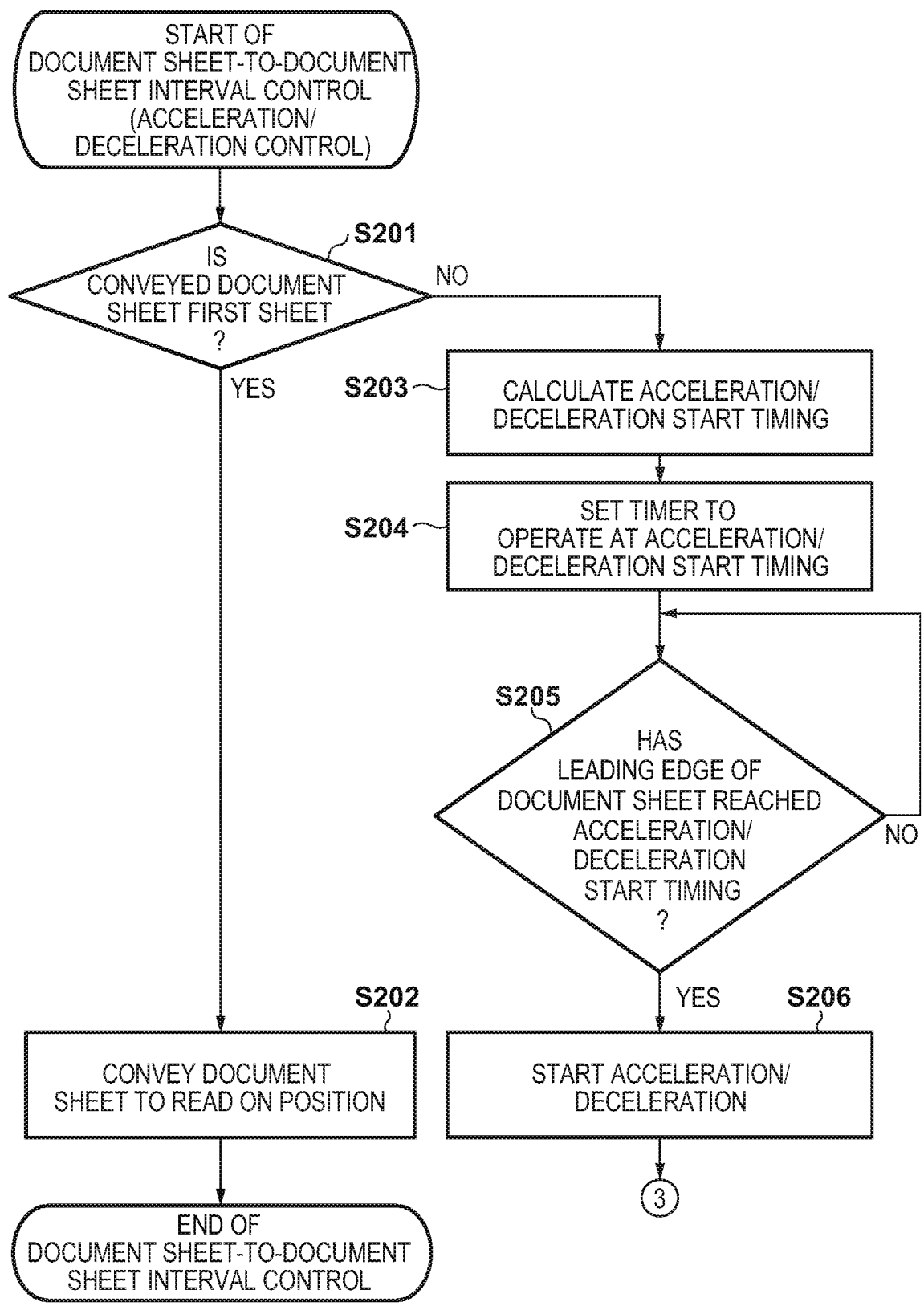
FIGS. 5A and 5B are flowcharts of processing to control a document sheet-to-document sheet interval.
Figure 5B:
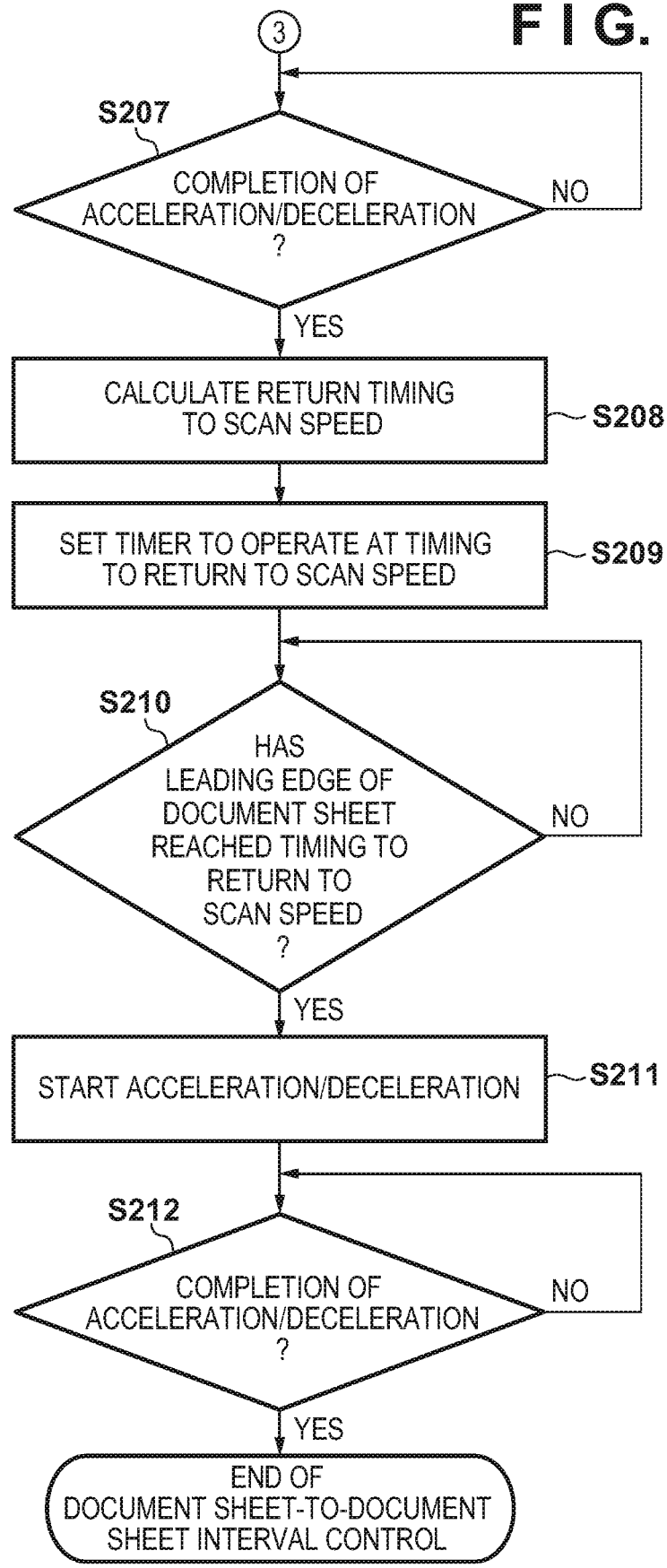

In step S108, the CPU 801 performs document sheet-to-document sheet interval control (acceleration/deceleration control). FIGS. 5A and 5B show the detailed processes of this document sheet-to-document sheet interval control.

In step S201, the CPU 801 determines whether the conveyed document sheet is the first sheet. If it is the first sheet (YES in step S201), the process advances to step S202. Otherwise (NO in step S202), the process advances to step S203.

In step S202, the CPU 801 conveys the document sheet to the detection position of the read sensor 18. At this time, acceleration control may be executed on the first sheet, with no preceding sheet, to improve DF-FCOT (the first copy output time of the document feeder job). At this time, the document sheet is conveyed to the detection position of the read sensor 18, shown in FIG. 6D, via the detection position of the post-pullout sensor 16, shown in FIG. 6C. The processing related to a case in which the document sheet is not the first sheet is the same as the control performed after a sheet-to-sheet interval measurement operation, and thus a description will be given later. The explanation returns to FIGS. 4A and 4B.

In step S109, the CPU 801 determines whether it has detected that the read sensor 18 has changed to ON. After the CPU detects that the read sensor 18 has changed to ON (YES in step S109), the process advances to step S110.

In step S110, the CPU 801 starts image scanning. Image scanning is implemented by irradiating the document sheet S1, shown in FIG. 6E, with light by the LEDs 203 of the optical scanner unit 202, and causing the image scanning sensor 208 to scan the reflected light. At this time, the scanned image is transmitted to the image processing unit 808 via the image communication unit 303 and undergoes image processing such as shading correction control which is performed by using the shading coefficient calculated in step S104.

In addition, the image that has undergone image processing is input to a document width detecting unit 809 via an image communication unit 304. The document width detecting unit 809 has a function of detecting shadows in both edges of the document sheet in the main scanning direction to detect the document sheet width from the image. On the other hand, the image processing unit 808 transmits the image to the image processing controller 300 via image communication units 305 and 306.

In step S111, the CPU 801 determines whether it has received a notification that the detection of the width (the main scanning direction length) of the document sheet has been completed. The completion of the detection of the width of the document sheet indicates the completion of the detection by the document width detecting unit 809. In the detection of the width of the document sheet, for example, the width of the document sheet from the leading edge portion can be detected by using only a region within the length of 100 [mm] from the leading edge portion of the document sheet. That is, the width of the document sheet can be quickly detected without having to scan the entire image. In this case, the completion of the detection of the width of the document sheet is notified to the CPU in accordance with the completion of a conveyance operation corresponding to the length of 100 [mm] from the leading edge portion of the document sheet. Note that when detecting the width (the main scanning direction length) of the document sheet, the CPU 801 may use the conveyance path width sensors 13 positioned on the conveyance path for the determination of the width of the document sheet. If the completion of the detection of the width of the document sheet is notified (YES in step S111), the process advances to step S112.

In step S112, the CPU 801 calculates the absolute value of the difference between the width of the regulating member obtained in step S106 and the width of the document sheet detected in step S111, and executes magnitude comparison between the obtained absolute value of the difference and a predetermined threshold α. Assume that the predetermined threshold α is, for example, 10 [mm]. Note that the predetermined threshold α is stored in the ROM 802 or the like and the value is not particularly limited to this. In a case in which the predetermined threshold α is larger (YES in step S112), the process advances to step S115. If the absolute value of the difference is equal to or larger than the predetermined threshold α (NO in step S112), the process advances to step S113.

Figure 10A:
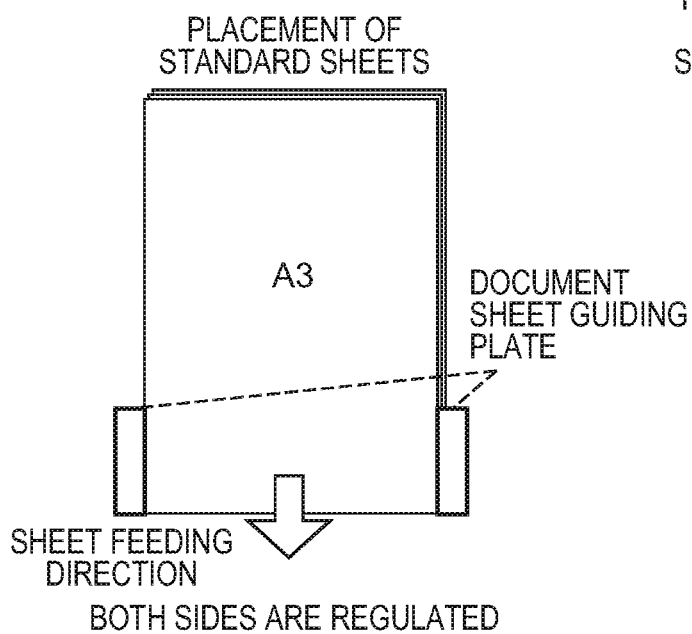
FIGS. 10A to 10D are views for explaining estimated document placement patterns on a document tray.
Figure 10B:
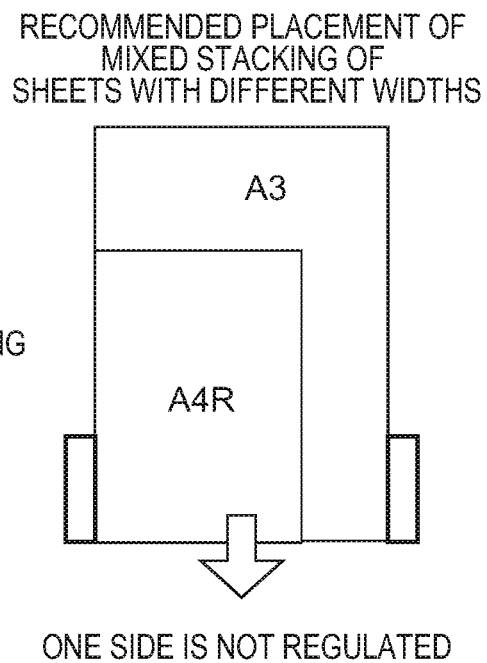

In a case in which the absolute value of the difference between the width of the regulating member obtained in step S106 and the width of the document sheet detected in step S111 is larger than the predetermined threshold α, it is determined that the document bundle is set as uneven stacking of sheets. On the other hand, in a case in which the absolute value of the difference between the width of the regulating member obtained in step S106 and the width of the document sheet detected in step S111 is small, it is determined that the document bundle is not set as uneven stacking of sheets, and the scanning of the document sheets are continued by keeping the previous sheet-to-sheet interval intact. As a result, as shown in FIG. 10A, the scanning productivity can be increased for a case in which the document bundle has been placed properly on the document tray 30. In FIG. 7, reference symbol Ls denotes the width of the regulating member obtained in step S106 and reference symbol Lp denotes the width of the document sheet detected in step S111. FIG. 7 also shows the condition in which the document bundle is determined to be set as uneven stacking of sheets (FIGS. 10B and 10D) and the condition in which the document bundle is determined to be set as normal stacking of sheets (FIG. 10A).

Figure 10C:
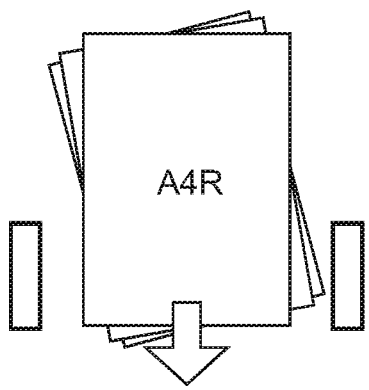
Figure 10D:
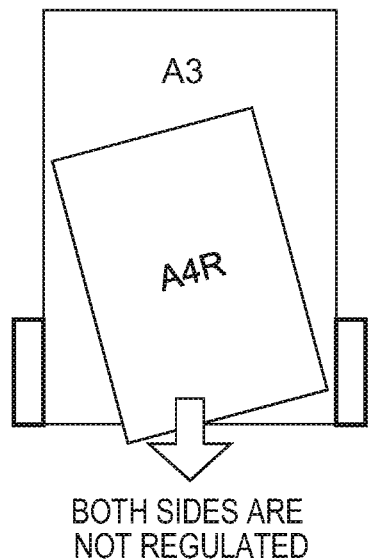

In step S113, the CPU 801 executes a setting to increase the sheet-to-sheet interval for the next and subsequent document sheets. The sheet-to-sheet interval of the document sheets indicates the distance from the trailing edge of the document sheet in the document sheet scanning portion, that is, near the center of the obverse surface glass facing member 6 to the leading edge of the document sheet to be conveyed next. For example, in the case in which 40 [mm] is preset for standard-sized sheets as a default value of the sheet-to-sheet interval, the interval is doubled to 80 [mm] by executing the setting to increase the sheet-to-sheet interval. By executing this setting, it is possible to prevent, even if the document sheet is skewed, the trailing edge of the currently scanned document sheet and the leading edge of the document sheet to be scanned next from overlapping each other in the scanning portion. Hence, in a case in which the an uneven document bundle is placed on the document tray 30 as shown in FIGS. 10C and 10D, the generation of an image defect in the scanning portion can be prevented by performing control to increase the sheet-to-sheet interval.

Note that the CPU 801 may execute the setting to increase the sheet-to-sheet interval for the next document sheet and the subsequent sheets so as to widely increase the sheet-to-sheet interval in proportion to the skew amount by using a known skew amount of the document sheet. Also, even in a case in which the document sheet-to-document sheet interval has already been increased in step S102, the CPU 801 may make, in step S113, a setting to increase the sheet-to-sheet interval more than the distance set in step S102. Additionally, the default value of the sheet-to-sheet interval and the value of the sheet-to-sheet interval after the execution of the setting to increase the sheet-to-sheet interval are not limited to those described above, and other values may be used. For example, the values may be determined in accordance with the size of each document sheet to be conveyed or in accordance with the combination of the mixed stacked document sheets. Values which are the same as or different from those used in step S102 may be used. The value of the sheet-to-sheet interval may be derived in accordance with the absolute value of the difference between the width of the regulating member and the width of the document sheet.

In step S114, the CPU 801 uses the operation display unit 904 to notify the user of the uneven placement of the document sheets. Here, the CPU 801 notifies the CPU 901 of a command via the command communication unit 301. FIG. 8 shows a display example of a screen 800 which is to be displayed on the operation display unit 904. Note that in the displaying operation on the operation display unit 904, a selection option to switch whether to display/not display the screen may be provided on the setting of the operation display unit 904.

Figure 6E:
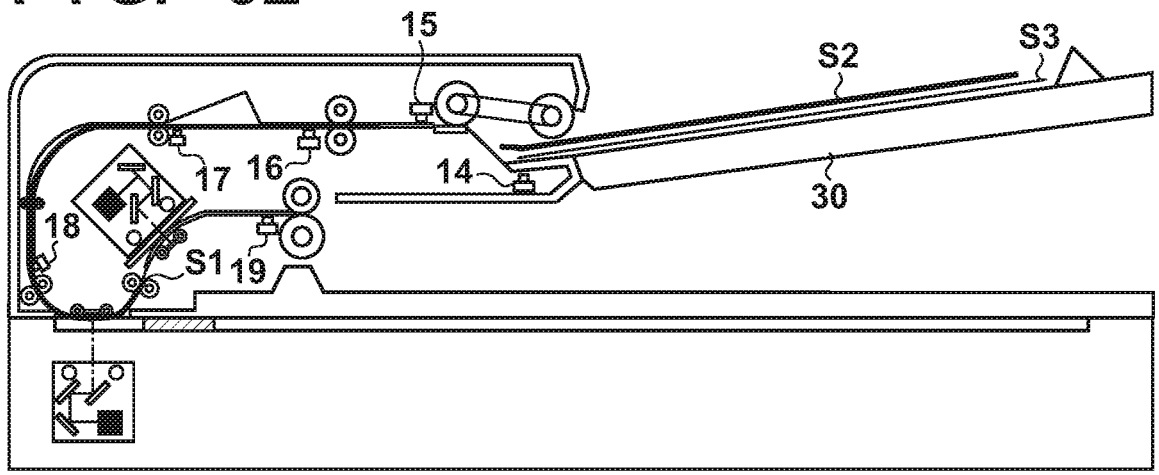

In step S115, the CPU 801 determines whether it has detected that the post-separation sensor 15 has been set to OFF. The document sheet S1 in FIG. 6E shows the position of the document sheet on the conveyance path at this point. Note that execution step S115 is shown here as an example for the sake of descriptive convenience of the flowchart. In general, the detection timing of the trailing edge of the document sheet changes in accordance with the length of the document sheet in the sub-scanning direction (conveyance direction). In order to be able to detect the trailing edge of the document sheet at an arbitrary timing, it is possible to set a task for detecting the trailing edge of the document sheet, and thus, in general, the detection of the trailing edge of the document sheet is performed by adopting a multi-task arrangement. That is, the detection of the OFF state of the post-separation sensor 15 in step S115 is not limited to this timing. When the CPU detects that the post-separation sensor 15 has been set to OFF (YES in step S115), the process advances to step S116.

In step S116, the CPU 801 determines whether the document absence/presence detection sensor 14 is set to the ON state. If the document absence/presence detection sensor 14 is set to the ON state, it is determined that a document sheet to be fed next is present on the document tray 30. A document sheet S2 in FIG. 6E shows the document sheet position at this point. If the document absence/presence detection sensor 14 is set to the ON state (YES in step S116), the process advances to step S117. Otherwise (NO in step S116), the process advances to step S122.

In step S117, the CPU 801 starts the conveyance of the document sheet S2. That is, the separation motor 805 is driven to cause the feed roller 1 to rotate and convey the document sheet S2 into the apparatus.

Figure 6F:
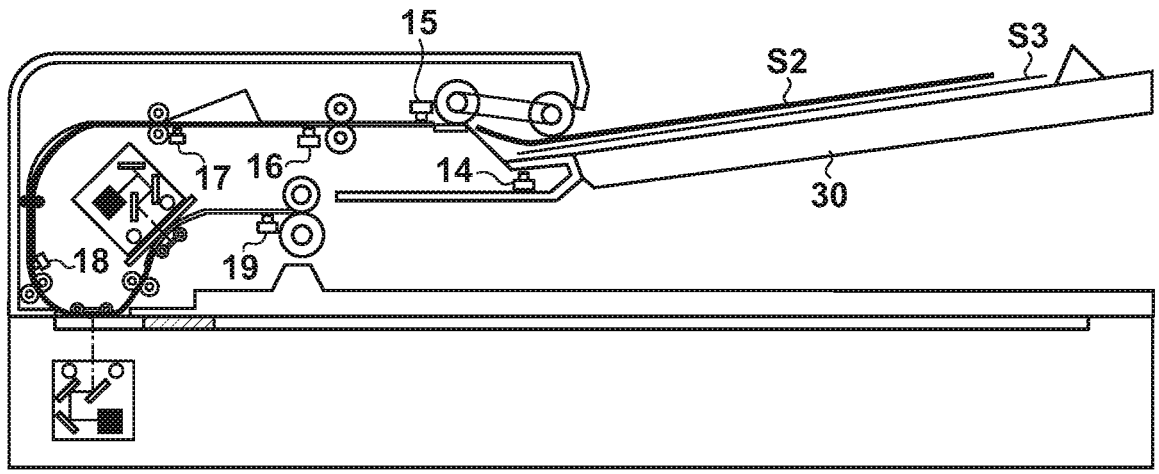

In step S118, the CPU 801 determines whether the post-pullout sensor 16 is set to the OFF state. FIG. 6F shows the position of the document sheet S1 on the conveyance path immediately after the post-pullout sensor 16 has changed to the OFF state. If it is determined that the post-pullout sensor 16 is set to the OFF state (YES in step S118), the process advances to step S119.

In step S119, the CPU 801 starts the measurement of the sheet-to-sheet interval distance immediately after step S118. At the start of the measurement of the sheet-to-sheet interval distance, the CPU 801 measures the current number of rotational pulses for rotating and driving the corresponding motor and holds the measured number of rotational pulses in the RAM 803. Note that in a case in which the CPU 801 includes an internal timer (not shown) that counts time, it may be arranged so that the start timing can be specified by holding the time of the execution of the process of step S119 in the RAM 803.

Figure 6G:
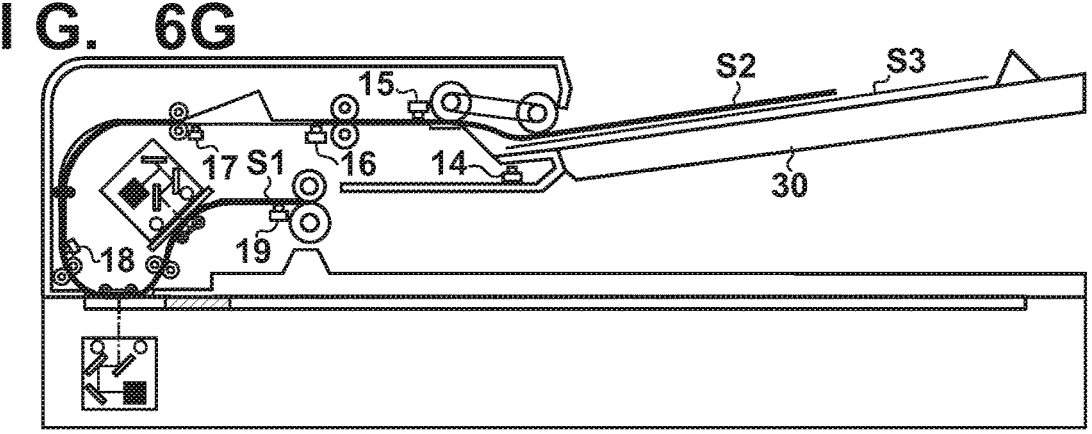
Figure 6H:
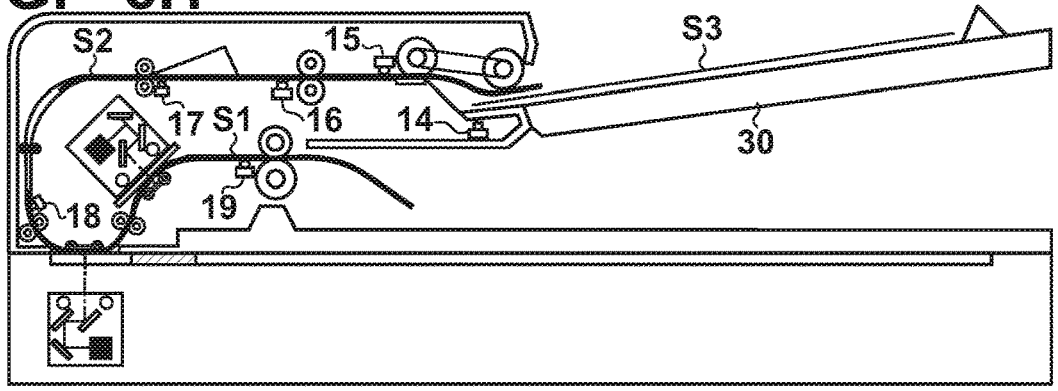
Figure 6I:
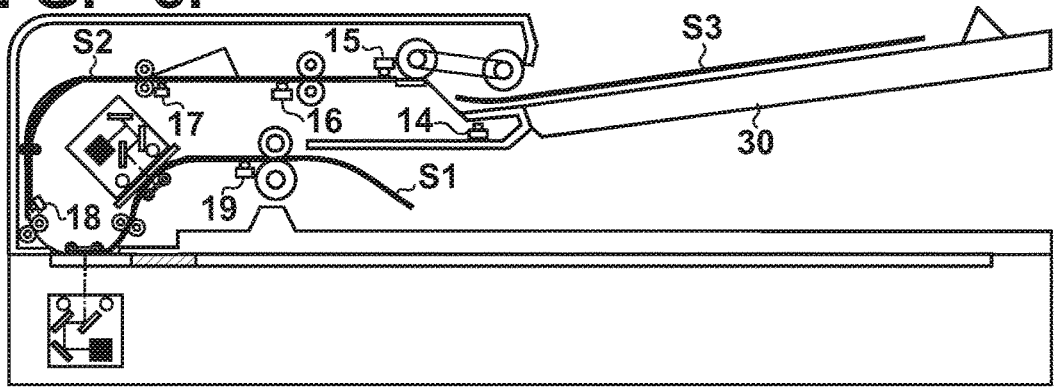

In step S120, the CPU 801 determines whether the post-pullout sensor 16 is set to the ON state. The document sheet S2 in FIG. 6G shows the position of the document sheet S2 on the conveyance path immediately after the post-pullout sensor 16 has changed to the ON state. If it is determined that the post-pullout sensor 16 is set to the ON state (YES in step S120), the process advances to step S121.

In step S121, the CPU 801 completes the measurement of the sheet-to-sheet interval distance immediately after step S120. Upon completion of the measurement of the sheet-to-sheet interval distance, the CPU 801 measures the current number of rotational pulses for rotating and driving the corresponding motor, calculates the sheet-to-sheet interval distance from the difference between the current number of rotational pulses and count value obtained in step S119, and holds the calculated distance in the RAM 803. Note that in a case in which the CPU 801 includes an internal timer (not shown) that counts time, it may be arranged so as to calculate the sheet-to-sheet interval distance from the difference between the time at the execution of the process of step S121 and the time obtained in step S119 and to hold the calculated distance in the RAM 803. Subsequently, the process returns to step S108 to perform the document sheet-to-document sheet interval control (acceleration/deceleration control).

Here, the detailed processes of the document sheet-to-document sheet interval control will be shown with reference to FIGS. 5A and 5B. In a case in which the document sheet-to-document sheet interval control (step S108) is to be performed upon returning from the process of step S121, the control process will be performed for the second and subsequent document sheets. Hence, the determination in step S201 will be "NO", and the process advances to step S203.

In step S203, the CPU 801 calculates the acceleration/deceleration start timing. In the calculation of the acceleration/deceleration start timing, the acceleration/deceleration start timing is calculated from the sheet-to-sheet interval measured in step S121 of FIG. 4B, the target sheet-to-sheet interval, scan conveyance speed, and the sheet-to-sheet interval distance adjustment speed.

Figure 11:
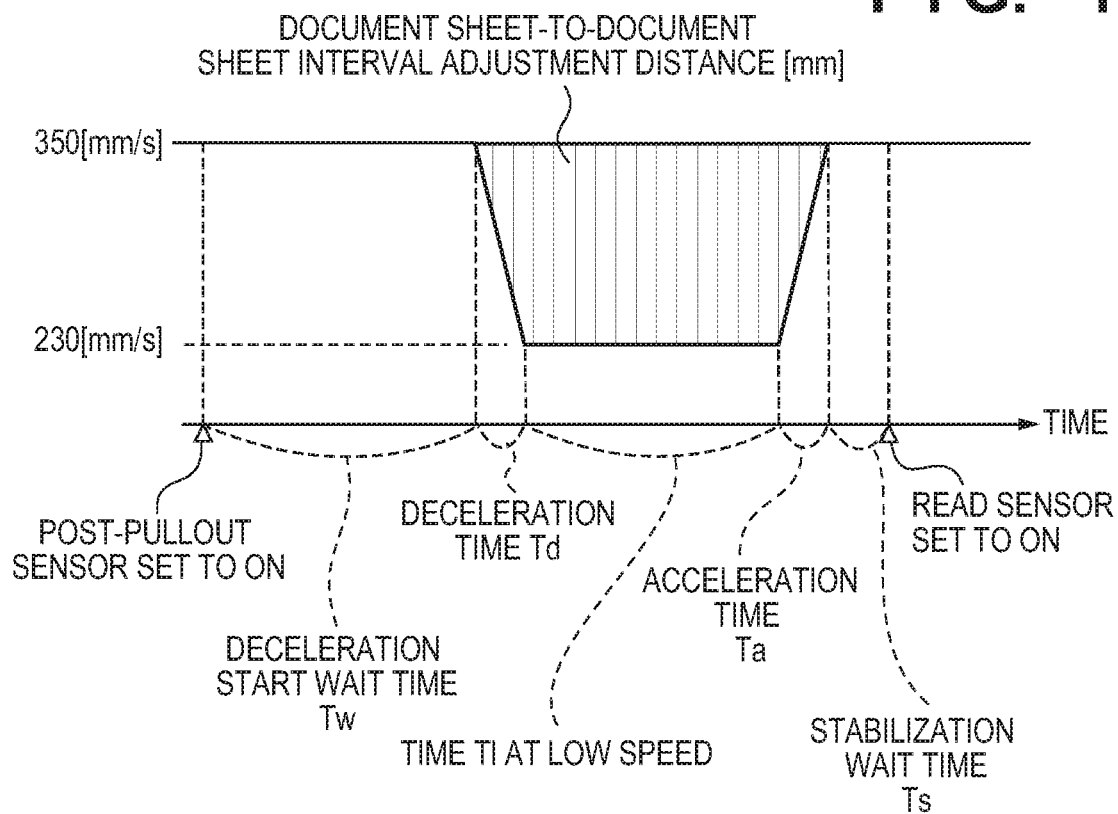
FIG. 11 is a view for explaining an adjustment distance and a motor rotational speed at the time of deceleration in a sheet-to-sheet adjustment operation.

FIG. 11 shows an example of the motor rotational speed at deceleration in the sheet-to-sheet interval control for adjusting the document sheet-to-document sheet interval. The concept of document sheet-to-document sheet interval control (acceleration/deceleration control) will be described with reference to FIG. 11.

A case in which the sheet-to-sheet interval measured in step S121 is 50 [mm], the sheet-to-sheet interval distance set in step S113 is 80 [mm], the scan conveyance speed is 350 [mm/s], and the sheet-to-sheet interval distance adjustment speed is 230 [mm/s] will be assumed in the following explanation. Also, assume that the distance from the ON position of the post-pullout sensor 16 to the ON position of the read sensor 18 is 220 [mm].

Note that the scan conveyance speed and the sheet-to-sheet interval distance adjustment speed need not be limited to the speeds described above. In addition, it is possible to change the sheet-to-sheet interval distance adjustment speed in accordance with the sheet-to-sheet interval distance set in step S113. Here, these numerical values will be used as an example in the description.

FIG. 11 is a graph whose abscissa and ordinate represent time and speed, respectively, and shows the document conveyance speed in the document sheet-to-document sheet interval control. The time shown here is the time from the ON timing of the post-pullout sensor 16 until the ON timing of the read sensor 18. Two speeds, that is, the document conveyance speed 350 [mm/s] at the time of scanning and the decelerated speed 230 [mm/s] used when increasing the sheet-to-sheet interval, are shown as the ordinate speeds. Note that the speeds need not be limited to 350 [mm/s] and 230 [mm/s].

When a document sheet (for example, the document sheet S1 in FIG. 6G) is being scanned at a speed of 350 [mm/s], the sheet-to-sheet interval is increased by decelerating the speed of a next document (for example, the document sheet S2 in FIG. 6G) to be scanned. In this case, assume that the speed of the preceding document sheet (for example, the document sheet S1 in FIG. 6G) is constant (350 [mm/s] in the case of the above example). In this case, the speed of the next document is decelerated so that the area of a trapezoid indicated by vertical lines in FIG. 11 will be the separation distance of the document sheet-to-document sheet interval. Note that in a case in which the sheet-to-sheet interval is to be decreased, the succeeding document sheet (for example, the document sheet S2 in FIG. 6G) may be accelerated.

First, the sheet-to-sheet interval measured in step S121 is 50 [mm] and the sheet-to-sheet interval distance set in step S113 is 80 [mm]. Hence, the document sheet S2 shown in FIG. 6G need to be separated from the preceding document sheet S1 by a distance of 30 [mm] by decelerating the separation motor 805 and the pullout motor 806. That is, control is performed so that the area of the trapezoid indicated by the vertical lines in FIG. 11 will represent a distance of 30 [mm].

Hence, a deceleration start timing and an acceleration start timing to return the scan conveyance speed to its original speed need to be set. In the present invention, the acceleration start timing to start the acceleration to return the scan conveyance speed to its original speed is fixed to 10 [mm] before the ON position of the read sensor 18. As a result, control can be performed by setting only the deceleration start timing as a variable.

At this time, the document sheet-to-document sheet interval is controlled by obtaining a deceleration start wait time Tw and time Tl at a low speed in FIG. 11. First, the time Tl at a low speed is obtained to perform control so that area of the trapezoid indicated by the vertical lines in FIG. 11 will represent a distance of 30 [mm]. That is, in this example, the time Tl at a low speed is obtained by $$\{Tl+(Td+Tl+Ta)\}[s] \times (350-230) \text{ [mm/s]}/2=30 \text{ [mm]} \quad (1)$$

On the other hand, in an arrangement in which the separation motor 805 and the pullout motor 806 can be accelerated/decelerated in the same acceleration rate, control can be performed so as to start the acceleration/deceleration of the motors at the same timing. When the scanning speed is 350 [mm/s] and the sheet-to-sheet interval distance adjustment speed is 230 [mm/s], a deceleration time Td and an acceleration time Ta are 4.1 [ms] and 8.3 [ms], respectively. That is, $$\text{deceleration time } Td=4.1 \text{ [ms]} \quad (2)$$

$$\text{acceleration time } Ta=8.3 \text{ [ms]} \quad (3)$$

By equations (1), (2), and (3)

$$\{Tl+(0.0041+Tl+0.0083)\} \times 120/2=30 \quad (4)$$

thereby, $Tl=0.244$ [s]. Therefore, $$\text{time } Tl \text{ at a low speed}=244 \text{ [ms]} \quad (5)$$

Figure 12:
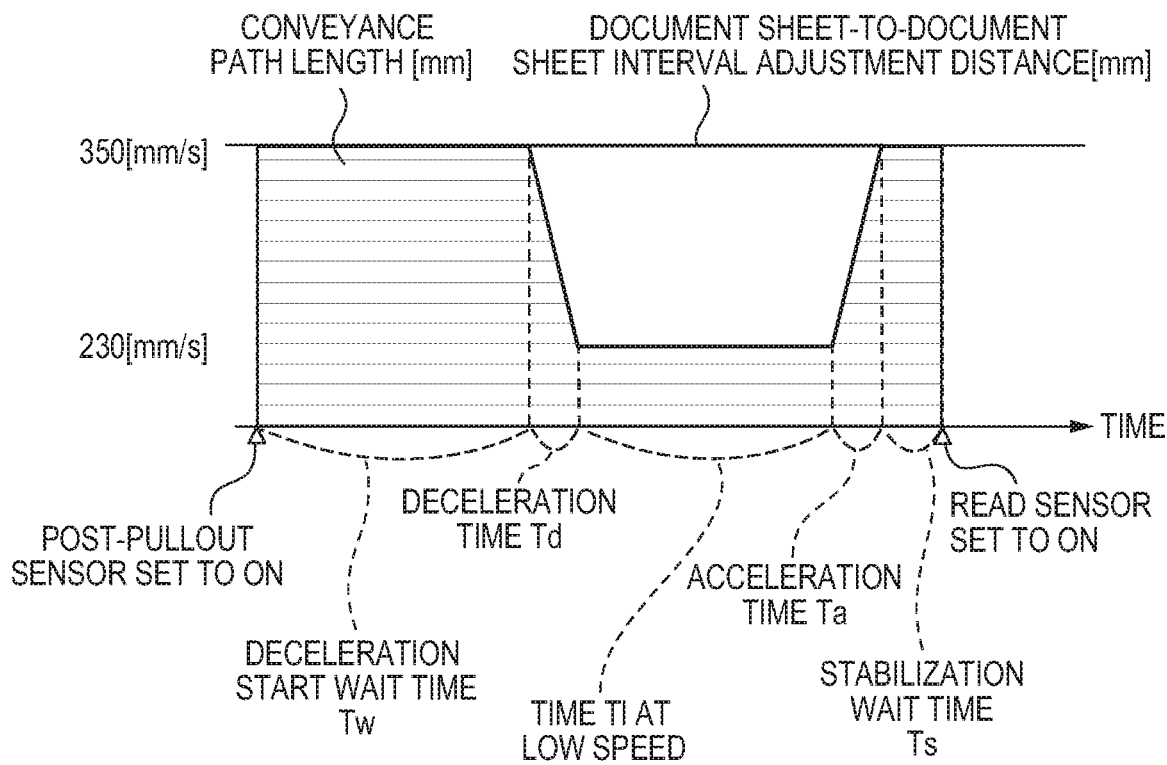
FIG. 12 is a view for explaining the adjustment distance and the motor rotational speed at the time of deceleration in the sheet-to-sheet adjustment operation.

Finally, the deceleration start wait time Tw is obtained. The distance from the ON position of the post-pullout sensor 16 to the ON position of the read sensor 18 is 220 [mm] on the conveyance path, it suffices to make a calculation so that the area of a region indicated by horizontal lines in FIG. 12 will be 220 [mm]. FIG. 12 is a graph showing, in the same manner as FIG. 11, the document conveyance speed in the document sheet-to-document sheet interval control and in which the abscissa and the ordinate represent time and speed, respectively. The region indicated by horizontal lines represents the distance in which the document sheet has been conveyed from the ON timing of the post-pullout sensor 16 to the ON timing of the read sensor 18.

The distance in which the document sheet has been conveyed from the ON timing of the post-pullout sensor 16 to the ON timing of the read sensor 18 is $$(Tw+Td+Tl+Ta+Ts) \text{ [s]} \times 350 \text{ [mm/s]}-30 \text{ [mm]}=220 \text{ [mm]} \quad (6)$$

The deceleration start wait time Tw can be obtained by using equation (6).

As described above, a stabilization wait time Ts is determined so as to be a distance of 10 [mm] before the ON position of the read sensor 18 in FIG. 11. Here, the stabilization wait time Ts is $$10 \text{ [mm]}/350 \text{ [mm/s]} \approx 28.6 \text{ [ms]}$$

Hence, $$\text{stabilization wait time } Ts=28.6 \text{ [ms]} \quad (7)$$

By equations (1), (2), and (7), equation (6) is $$(Tw+0.0041+0.244+0.0083+0.00286) \times 350-30=220$$

$$Tw=0.284 \text{ [ms]}$$

Hence, $$\text{deceleration start wait time } Tw=284 \text{ [ms]} \quad (8)$$

These numerical values are used to obtain the deceleration start timing and the acceleration start timing.

In addition, in an arrangement in which the number of motor pulses can be counted, it is possible to perform sheet-to-sheet interval adjustment with higher accuracy by performing control by using not the time of the internal timer (not shown) incorporated in the CPU 801 but the advancement amount per pulse of the motor. Furthermore, although FIG. 11 showed an example of the motor rotational speed at deceleration, the same kind of control can be performed when the sheet-to-sheet interval is to be decreased by accelerating the motors.

In step S203, the CPU 801 calculates the acceleration/deceleration start timing. In this example, from the above-described calculations, the acceleration/deceleration start timing is the timing at which the deceleration start wait time Tw (284 [ms]) has elapsed since the post-pullout sensor 16 has changed to ON.

In step S204, CPU 801 sets the internal timer (not shown) based on the time obtained in step S203 to cause the timer to operate at the acceleration/deceleration start timing. Note that it is also possible to perform sheet-to-sheet interval adjustment with higher accuracy by performing control by using the advancement amount per one pulse of the motor instead of the time of the internal timer (not shown).

In step S205, the CPU 801 stands by until the leading edge of the document sheet reaches the acceleration/deceleration start timing. That is, the CPU 801 determines whether the deceleration start wait time Tw has elapsed since the post-pullout sensor 16 has changed to ON upon detecting the leading edge of the document sheet. When it is detected that the leading edge of the document sheet has reached the acceleration/deceleration start timing (YES in step S205), the process advances to step S206.

In step S206, the CPU 801 starts the acceleration/deceleration of the motors. In this embodiment, the separation motor 805 and the pullout motor 806 are simultaneously decelerated. The position of the leading edge of the document sheet is, for example, at the position of the document sheet S2 in FIG. 6H.

In step S207, the CPU 801 determines whether the completion of the deceleration of the separation motor 805 and the pullout motor 806 has been detected. The deceleration completion detection method may be arranged so that an interrupt is accepted upon detecting the number of pulses corresponding to the acceleration/deceleration completion pulse count. As the deceleration completion detection method, it is also possible to adopt other arrangements such as an arrangement that accepts a motor acceleration/deceleration completion interrupt, an arrangement in which the completion of acceleration/deceleration is assumed at the elapse of the deceleration time Td obtained above, and the like. Upon detecting the completion of acceleration/deceleration (YES in step S207), the process advances to step S208.

In step S208, the CPU 801 calculates the scan speed return timing. The scan speed return timing is the time Tl at a low speed and is, in this example, 244 [ms] according to the calculation obtained above.

In step S209, the CPU 801 sets the internal timer (not shown) to the time obtained in step S208 so as to cause the timer to operate at the scan speed return timing. Note that it is also possible to perform sheet-to-sheet interval adjustment with higher accuracy by performing control by using the advancement amount per one pulse of the motor instead of the time of the internal timer (not shown).

In step S210, the CPU 801 stands by until the leading edge of the document sheet reaches the scan speed return timing. That is, it is determined whether a time (Tw+Td+Tl) has elapsed since the post-pullout sensor 16 has detected the leading edge of the document sheet and changed to ON. If it is detected that the leading edge of the document sheet has reached the scan speed return timing (YES in step S210), the process advances to step S211.

In step S211, the CPU 801 starts the acceleration/deceleration of the motors. In this embodiment the separation motor 805 and the pullout motor 806 are simultaneously accelerated.

In step S212, the CPU 801 stands by until the completion of the acceleration/deceleration of the separation motor 805 and the pullout motor 806. The acceleration/deceleration completion detection method may be arranged so that an interrupt is accepted upon detecting the number of pulses corresponding to the acceleration/deceleration completion pulse count. As the acceleration/deceleration completion detection method, it is also possible to adopt other arrangements such as an arrangement that accepts a motor acceleration/deceleration completion interrupt, an arrangement in which the completion of acceleration/deceleration is assumed at the elapse of the acceleration time Ta obtained above, and the like. When the completion of the acceleration of the separation motor 805 and the pullout motor 806 has been detected (YES in step S212), the control operation to set a predetermined sheet-to-sheet interval is completed, and the main processing procedure ends. That is, in the case of this example, the sheet-to-sheet interval can be set to the sheet-to-sheet interval distance of 80 [mm] set in step S113.

The explanation will return to FIGS. 4A and 4B. Upon completing the document sheet-to-document sheet interval control (step S108) in FIGS. 5A and 5B, the CPU 801 returns to detect whether the read sensor 18 is ON in step S109. The position of the document sheet at this time is the position of the document sheet S2 shown in FIG. 6I. The CPU 801 continues to convey the remaining sheets of the document bundle S by the processes of steps S110 to S116 in the same manner as the first document sheet.

When no document sheet remains after all of the document sheets placed on the document tray 30 have been conveyed, the CPU 801 determines that the document absence/presence detection sensor 14 has been set to OFF (NO in step S116). In this case, the process advances to step S122.

In step S122, the CPU 801 determines whether it has detected that the read sensor 18 has been set to OFF. If the CPU detects that the read sensor 18 is OFF (YES in step S122), the process advances to step S123.

In step S123, the CPU 801 ends the image scanning operation.

In step S124, the CPU 801 determines whether it has detected that the sheet discharge sensor 19 has been set to OFF. If the CPU detects that the sheet discharge sensor 19 is OFF (YES in step S124), the process advances to step S125.

Figure 6J:
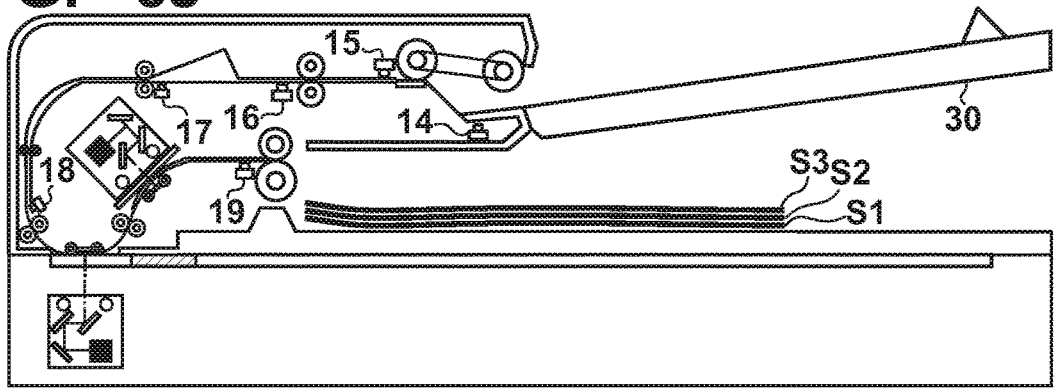

In step S125, the CPU 801 performs document sheet discharge processing. In the document sheet discharge processing, the CPU 801 stops the separation motor 805, the pullout motor 806, and the scan motor 807. FIG. 6J shows a state in which the document sheet discharge processing has been completed and the document sheets S1 to S3 have been discharged on the sheet discharge tray 20. Subsequently, the main processing procedure ends.

By using the above-described control operation, control to increase the sheet-to-sheet interval in the conveyance operation of a plurality of document sheets is performed when document sheets are unevenly stacked on the document tray or under a condition in which the document sheet may be easily skewed by the mixed-stacking of sheets. As a result, an image scanning apparatus that is easy to use and can suppress degradation in productivity while preventing the occurrence of a defective image can be provided.

Second Embodiment

[Document Sheet-to-Document Sheet Interval Control at Determination of Uneven Document Sheets on Tray]

Document sheet-to-document sheet interval control executed upon detection of uneven document sheets according to this embodiment will be described with reference to the accompanying drawings. Note that descriptions of portions that overlap with those in the first embodiment will be omitted, and only the differences will be described.

The difference between the first embodiment and the second embodiment is in the difference between the procedures of the respective control flowcharts. In the processing procedure (FIGS. 4A and 4B) described in the first embodiment, sheet-to-sheet interval control was performed in accordance with the difference between the width of the regulating member of the document guiding plate 31 of the document tray 30 and the width of each document sheet. On the other hand, in the processing procedure (FIGS. 9A to 9C) in this embodiment, sheet-to-sheet interval control is performed in accordance with the difference between the width of a regulating member of a document guiding plate 31 of a document tray 30 and a standard document sheet size.

Figure 9A:
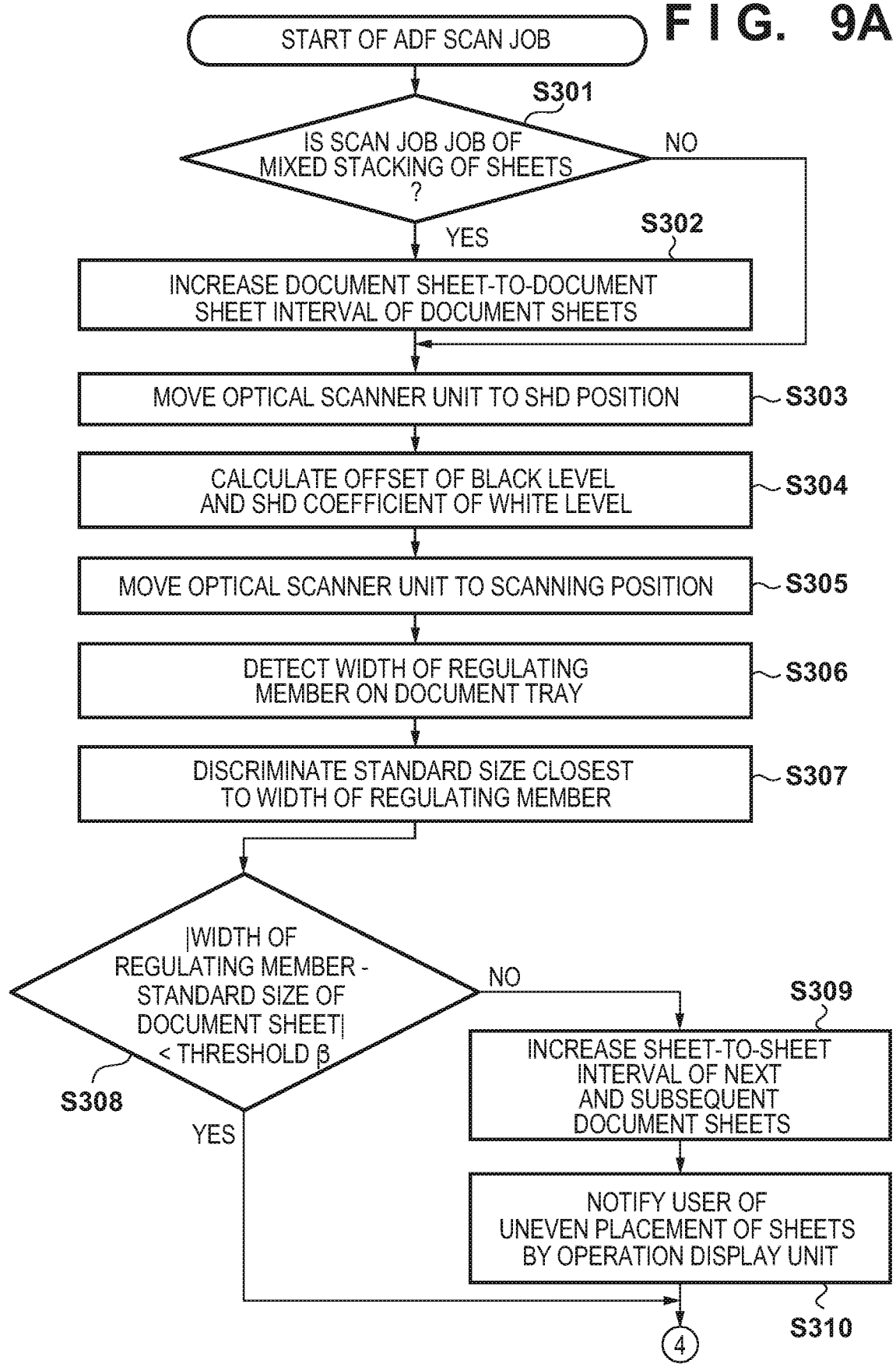
FIGS. 9A to 9C are flowcharts of a document sheet scanning operation according to the second embodiment.
Figure 9B:
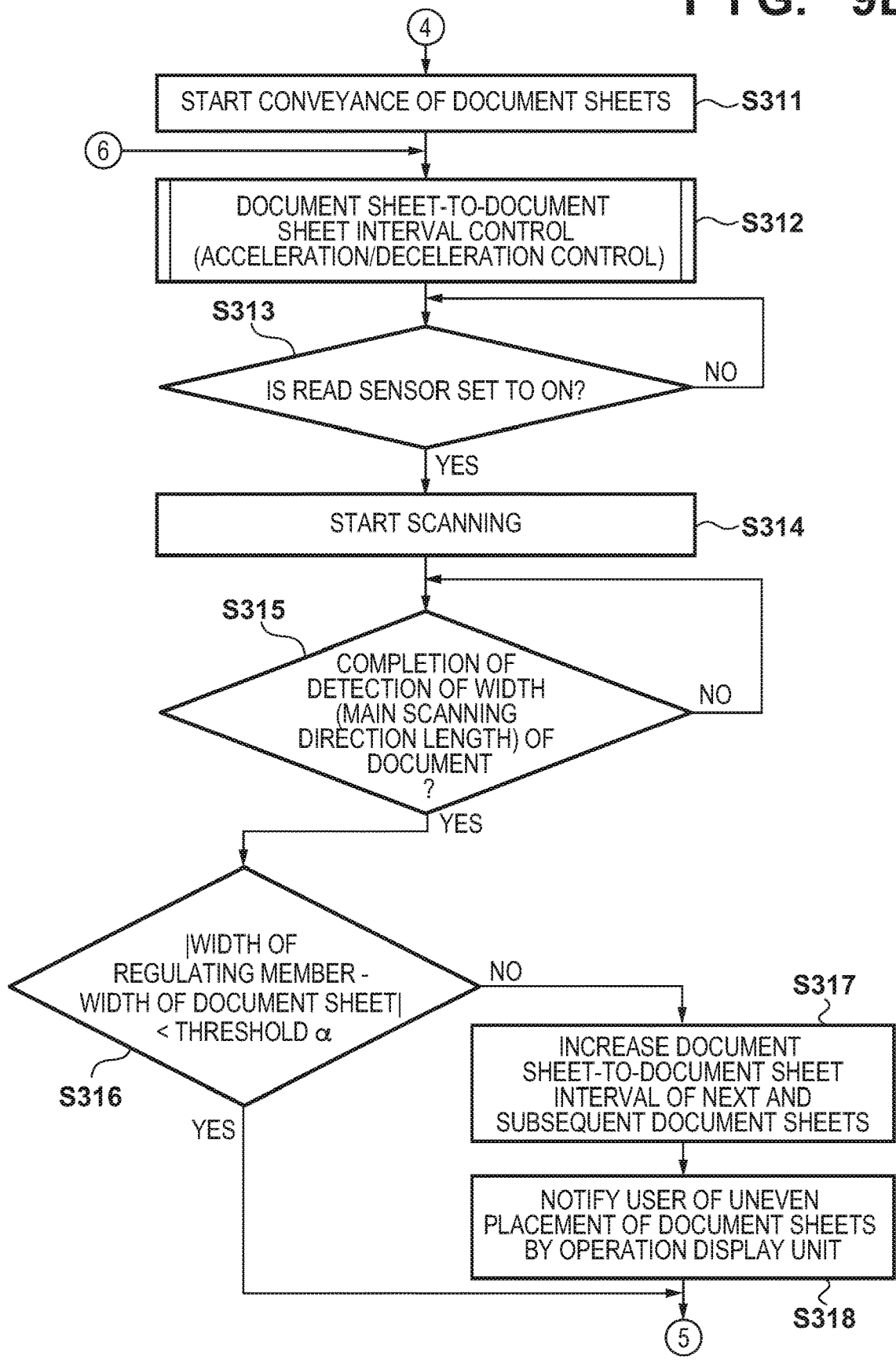
Figure 9C:
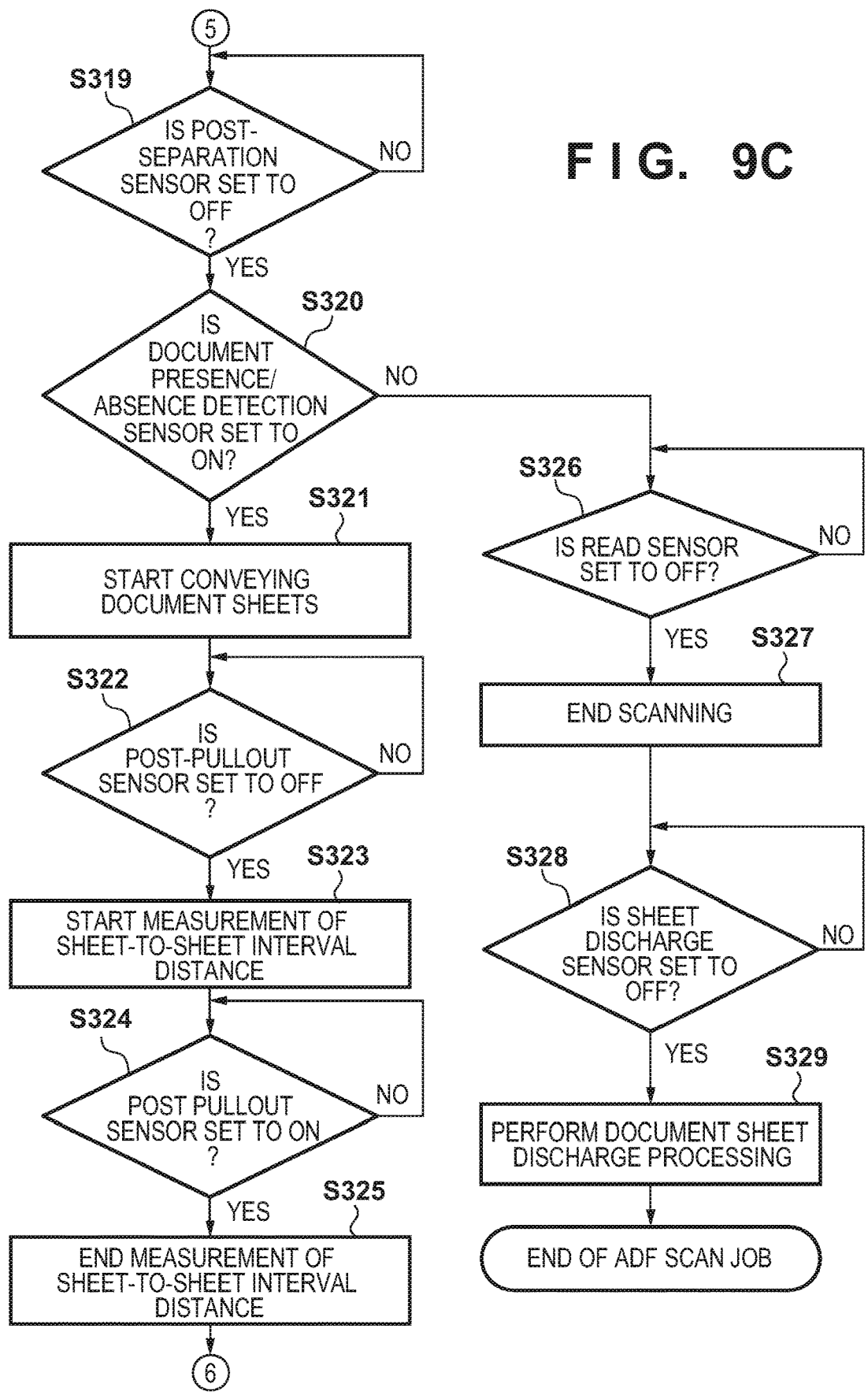

Document sheet-to-document sheet interval control executed when a document bundle is uneven on the document tray will be described with reference to FIGS. 9A to 9C. The processes of the flowcharts shown in FIGS. 9A to 9C are implemented by a CPU 801 reading out instructions stored in a ROM 802 as temporary data to the RAM 803 and executing the readout instructions. The processes of steps S301 to S306 in FIG. 9A correspond to the processes of steps S101 to S106 in FIG. 4A and are the same control operations, thus a detailed description will be omitted.

In step S307, the CPU 801 discriminates, as the size of the document sheet, a standard size that is closest to the width of the regulating member of the document guiding plate 31. The width of the regulating member of the document guiding plate 31 on the document tray 30 obtained in step S306 can be detected by a tray width detection sensor 12, and this width is indicated by reference symbol Ls in FIG. 2. In this embodiment, assume that a plurality of standard sizes have been predefined in a standard size list table (not shown) and this table is held in the ROM 802 of an image scanning apparatus 1000.

In the discrimination of the closest standard size, a size whose absolute value of difference with the width of the regulating member detected by the tray width detection sensor 12 is the smallest is selected from the size values in the standard size list table (not shown). For example, in a case in which A- or B-series document sheets are to be used, the standard size list table (not shown) holds the values of 297 [mm], 257 [mm], 210 [mm], 182 [mm], and 148 [mm]. In the discrimination of the standard size, if the width of the regulating member detected by the tray width detection sensor 12 is 220 [mm], 210 [mm] selected as the value that has the smallest absolute value of difference among the size values shown in the standard size list table. Note that a plurality of kinds of contents of the standard sizes may be held in the standard size list table (not shown) in accordance with the sizes of document sheets supported by the image scanning apparatus 1000.

In step S308, the CPU 801 calculates the absolute value of the difference between the width of the regulating member of the document guiding plate 31 on the document tray 30 obtained in step S306 and the standard size document width obtained in step S307, and compares the magnitude of the obtained absolute value of the difference and a threshold $\beta$. Assume that the threshold $\beta$ is, for example, 10 [mm]. Note that the threshold $\beta$ is stored in the ROM 802 or the like and is not limited to a particular value. If the threshold $\beta$ is larger (YES in step S308), the process advances to step S311. If the absolute value of the difference is equal to or larger than the threshold $\beta$ (NO in step S308), the process advances to step S309. Uneven stacking of sheets is determined when the absolute value of the difference between the width of the regulating member of the document guiding plate 31 obtained in step S306 and the document width obtained in step S307 is larger than the threshold $\beta$.

In step S309, the CPU 801 makes the setting to increase the interval of the next and subsequent document sheets. The document sheet-to-document sheet interval is the distance from the trailing edge of a document sheet to the leading edge of a document sheet to be conveyed next at the document sheet scanning portion, that is, near the center of an obverse surface glass facing member 6. For example, in a case in which each document sheet is a standard-size sheet and 40 [mm] has been set as the default value of the sheet-to-sheet interval, this value is doubled to 80 [mm] by performing the setting to increase the sheet-to-sheet interval. This can prevent, even if the document sheet is skewed, the trailing edge of the currently scanned document sheet and the leading edge of the document sheet to be scanned next from overlapping each other in the scanning portion. Note that the default value of the sheet-to-sheet interval and the value of the sheet-to-sheet interval after the execution of the setting to increase the sheet-to-sheet interval are not limited to those described above, and other values may be used.

In step S310, the CPU 801 uses an operation display unit 904 to notify the user of the uneven placement of sheets. Here, the CPU 801 notifies a CPU 901 of a command via a command communication unit 301. The screen 800 shown in FIG. 8 in the first embodiment can be used as an example of the display screen.

In step S311, the CPU 801 starts conveying the document sheets. Control processes of step S311 and subsequent steps in FIGS. 9B and 9C are the same as those of step S108 and subsequent steps in FIGS. 4A and 4B, and a detailed description will be omitted.

According to the above-described control operations, control to increase the sheet-to-sheet interval is performed when document sheets are unevenly stacked on the document tray or under a condition in which the document sheet can become greatly skewed such that the sheets are set in a mixed stacking state. As a result, in this embodiment, an image scanning apparatus that is easy to use and can suppress degradation in productivity while preventing the occurrence of a defective image can be provided.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-190957, filed Sep. 29, 2017, which is hereby incorporated by reference herein in its entirety.

What is claimed is:

1. An image scanning apparatus comprising:
 a stacking unit on which a document sheet is to be stacked;
 a pair of regulating members configured to regulate a position of the document sheet stacked on the stacking unit, at least one of the regulating members being movable in a width direction perpendicular to a conveyance direction of the document sheet;

a conveyance unit configured to convey the document sheet stacked on the stacking unit;

a scanning unit configured to scan an image on the document sheet conveyed by the conveying unit;

a first detecting unit configured to detect a length in the width direction between the regulating members;

a second detecting unit configured to detect the width of the document sheet conveyed by the conveyance unit; and a control unit configured to control a sheet-to-sheet interval when document sheets are to be conveyed by the conveyance unit, wherein in a case where a difference between the length detected by the first detecting unit and the width of a document sheet detected by the second detecting unit is smaller than a threshold, the control unit sets a first sheet-to-sheet interval as the sheet-to-sheet interval when the document sheets are to be conveyed, and in a case where the difference between the length detected by the first detecting unit and the width of the document sheet detected by the second detecting unit is larger than the threshold, the control unit sets a second sheet-to-sheet interval which is larger than the first sheet-to-sheet interval as the sheet-to-sheet interval when the document sheets are to be conveyed.

2. The apparatus according to claim 1, further comprising:
a notification unit configured to transmit a notification that document sheets are placed unevenly on the stacking unit in the case where the difference between the length detected by the first detecting unit and the width of the document sheet detected by the second detecting unit is larger than the threshold.

3. The apparatus according to claim 1, wherein the second detecting unit derives the width of the document sheet by detecting an edge of the document sheet from an image scanned by the scanning unit.

4. The apparatus according to claim 1, wherein the second detecting unit includes at least two sensors which are arranged in the width direction on a conveyance path from the stacking unit to the scanning unit.

5. The apparatus according to claim 1, wherein in a case in which an instruction to scan document sheets with different widths is received, the control unit sets the second sheet-to-sheet interval when the document sheets are to be conveyed.

6. The apparatus according to claim 1, wherein the control unit derives the sheet-to-sheet interval when the document sheets are to be conveyed based on the difference between the length detected by the first detecting unit and the width of the document sheet detected by the second detecting unit.

7. The apparatus according to claim 1, further comprising a third detecting unit configured to detect a skew amount of a document sheet, wherein the control unit derives the sheet-to-sheet interval when the document sheets are to be conveyed based on the skew amount of the document sheet detected by the third detecting unit.

8. An image scanning apparatus comprising:
a stacking unit on which the document sheet is to be stacked;
a pair of regulating members configured to regulate a position of the document sheet stacked on the stacking unit, at least one of the regulating members being movable in a width direction perpendicular to a conveyance direction of the document sheet;
a conveyance unit configured to convey the document sheet stacked on the stacking unit;

a scanning unit configured to scan an image on the document sheet conveyed by the conveying unit;

a detecting unit configured to detect a length in the width direction between the regulating members; and a control unit configured to control a sheet-to-sheet interval when document sheets are to be conveyed by the conveyance unit, wherein the control unit specifies, based on the length detected by the detecting unit, a width of the document sheet to be conveyed by the conveyance unit, the control unit sets, in a case where a difference between the length detected by the detecting unit and the specified width of the document sheet is smaller than a threshold, a first sheet-to-sheet interval when document sheets are to be conveyed, and the control unit sets, in a case where the difference between the length detected by the detecting unit and the specified width of the document sheet is larger than the threshold, a second sheet-to-sheet interval which is larger than the first sheet-to-sheet interval as the sheet-to-sheet interval when the document sheets are to be conveyed.

9. The apparatus according to claim 8, wherein the control unit specifies, as the width of the document sheet, a size which has a smallest value of a difference with the length of detected by the detecting unit from a plurality of predetermined document sizes.

10. The apparatus according to claim 8, further comprising:
a notification unit configured to transmit a notification that document sheets are stacked unevenly on the stacking unit in a case where the difference between the length detected by the detecting unit and the specified width of the document sheet is larger than the threshold.

11. The apparatus according to claim 8, wherein in a case in which an instruction to scan document sheets with different widths is received, the control unit sets the second sheet-to-sheet interval as the sheet-to-sheet interval when the document sheets are to be conveyed.

12. The apparatus according to claim 8, wherein the control unit derives, based on the difference between the length detected by the detecting unit and the specified width of the document sheet, the sheet-to-sheet interval when the document sheets are to be conveyed.

13. The apparatus according to claim 8, further comprising:
a second detecting unit configured to detect a skew amount of a document sheet,
wherein the control unit derives, based on the skew amount of the document sheet detected by the second detecting unit, the sheet-to-sheet interval when the document sheets are to be conveyed.

14. A method of controlling an image scanning apparatus, wherein the image scanning apparatus comprises:
a stacking unit on which a document sheet is to be stacked,
a pair of regulating members configured to regulate a position of the document sheet stacked on the stacking unit, at least one of the regulating members being movable in a width direction perpendicular to a conveyance direction of the document sheet,
a conveyance unit configured to convey the document sheet stacked on the stacking unit,
a scanning unit configured to scan an image on the document sheet conveyed by the conveying unit,
a first detecting unit configured to detect a length in the width direction between the regulating members, and a second detecting unit configured to detect the width of the document sheet conveyed by the conveyance unit, wherein the method comprises:

setting a first sheet-to-sheet interval as the sheet-to-sheet interval when the document sheets are to be conveyed in a case where a difference between the length detected by the first detecting unit and the width of a document sheet detected by the second detecting unit is smaller than a threshold, and setting a second sheet-to-sheet interval which is larger than the first sheet-to-sheet interval as the sheet-to-sheet interval when the document sheets are to be conveyed in a case where the difference between the length detected by the first detecting unit and the width of the document sheet detected by the second detecting unit is larger than the threshold.

15. A method of controlling an image scanning apparatus, wherein the image scanning apparatus comprises:

a stacking unit on which the document sheet is to be stacked, a pair of regulating members configured to regulate a position of the document sheet stacked on the stacking unit, at least one of the regulating members being movable in a width direction perpendicular to a conveyance direction of the document sheet, a conveyance unit configured to convey the document sheet stacked on the stacking unit, a scanning unit configured to scan an image on the document sheet conveyed by the conveying unit, and a detecting unit configured to detect a length in the width direction between the regulating members, wherein the method comprises:

specifying, based on the length detected by the detecting unit, a width of the document sheet to be conveyed by the conveyance unit, setting, in a case where a difference between the length detected by the detecting unit and the specified width of the document sheet is smaller than a threshold, a first sheet-to-sheet interval when document sheets are to be conveyed, and setting, in a case where the difference between the length detected by the detecting unit and the specified width of the document sheet is larger than the threshold, a second sheet-to-sheet interval which is larger than the first sheet-to-sheet interval as the sheet-to-sheet interval when the document sheets are to be conveyed.

* * * * *